(12) United States Patent
Hasegawa et al.

(10) Patent No.: US 7,706,619 B2
(45) Date of Patent: Apr. 27, 2010

(54) IMAGE PROCESSING DEVICE THAT PRODUCES HIGH-QUALITY REDUCED IMAGE AT FAST PROCESSING SPEED

(75) Inventors: Tomohiko Hasegawa, Nagoya (JP); Masaki Kondo, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 818 days.

(21) Appl. No.: 11/605,956

(22) Filed: Nov. 30, 2006

(65) Prior Publication Data

US 2007/0122043 A1    May 31, 2007

(30) Foreign Application Priority Data

Nov. 30, 2005    (JP)    ............................ P2005-347377
Nov. 30, 2005    (JP)    ............................ P2005-347378

(51) Int. Cl.
*G06K 9/36* (2006.01)

(52) U.S. Cl. ........................ 382/232; 382/240; 382/293

(58) Field of Classification Search ................. 382/232, 382/239, 240, 243, 233, 293; 375/E7.261; 235/454, 494, 462.01, 467, 468, 462.07, 235/460; 283/70
See application file for complete search history.

(56) References Cited

U.S. PATENT DOCUMENTS 4,975,976 A * 12/1990 Kimata et al. ............... 382/293

5,866,895 A * 2/1999 Fukuda et al. ............... 235/494

FOREIGN PATENT DOCUMENTS

JP    2003-256827 A    9/2003
JP    2004-104435 A    4/2004

* cited by examiner

*Primary Examiner*—Anh Hong Do
(74) *Attorney, Agent, or Firm*—Baker Botts L.L.P.

(57) ABSTRACT

A reduction-ratio acquiring section acquires a reduction ratio for reducing a source image into an output image. A division-number determining section determines a division number nDev for dividing each pixel constituting the source image into (nDev×nDev) division blocks, where nDev is an integer that is greater than or equal to two. A process-block-number calculating section calculates, based on the reduction ratio, a number of division blocks corresponding to a single pixel in the output image. An average-pixel-value calculating section calculates, for the single pixel, an average pixel value based on pixel values of the division blocks. The pixel values of the division blocks are pixels values of corresponding pixels in the source image. A repeating section allows the process-block-number calculating section and the average-pixel-value calculating section to repeat same processes for each pixel in the output image, thereby obtaining an entire output image.

26 Claims, 13 Drawing Sheets

(PROCESS PERFORMED ON PRINTER)

(PROCESS PERFORMED ON PRINTER)

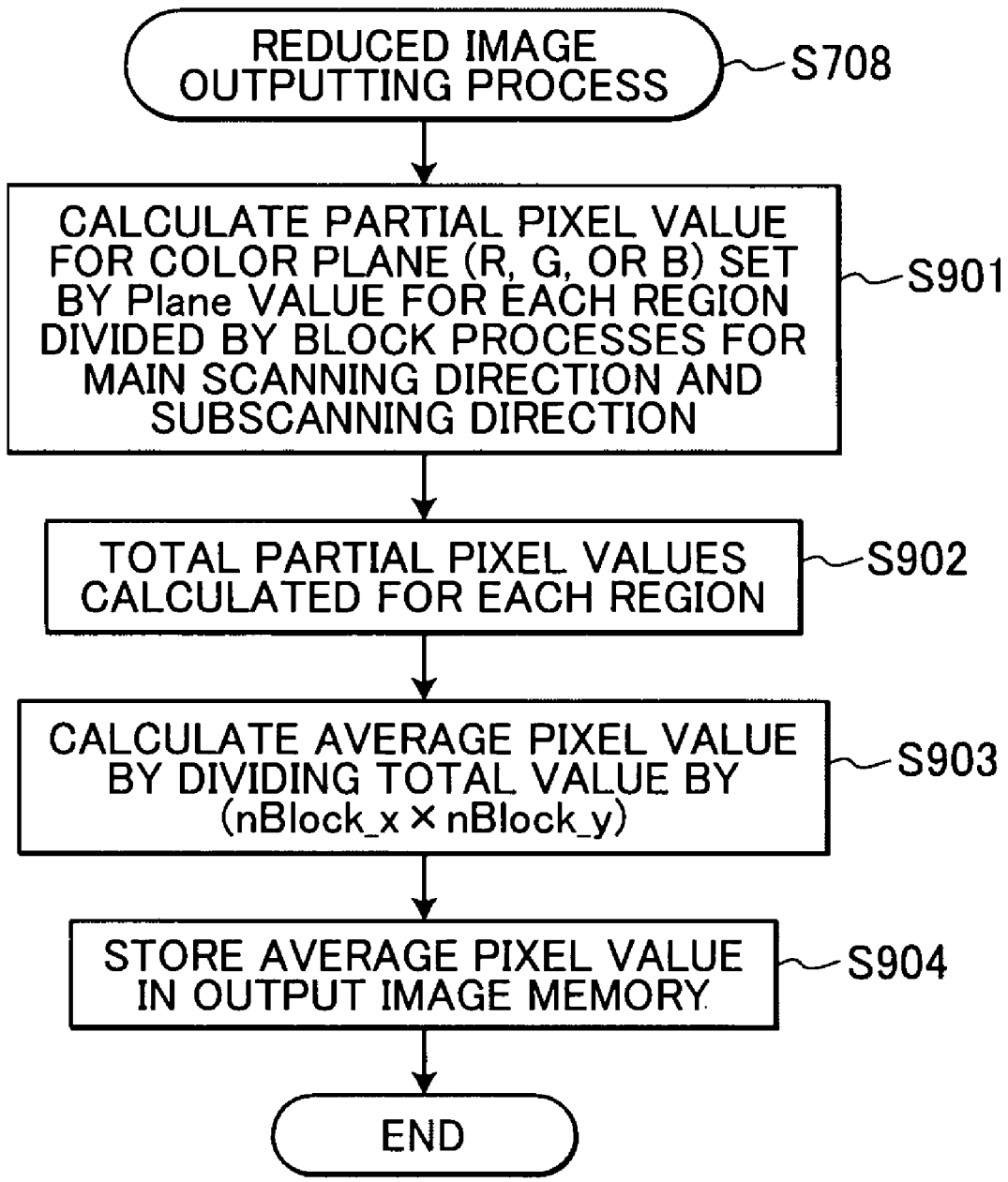

FIG.11

SOURCE IMAGE P: 8 MILLION PIXELS (2448 × 3264)

| REDUCING TECHNIQUE | DIVISION NUMBER nDev | NUMBER OF PIXELS IN OUTPUT IMAGE Q | | | | | |
|---|---|---|---|---|---|---|---|
| | | 7 MILLION PIXELS 2304 × 3072 | 6 MILLION PIXELS 2112 × 2816 | 5 MILLION PIXELS 1920 × 2560 | 4 MILLION PIXELS 1728 × 2304 | 3 MILLION PIXELS 1536 × 2048 | 2 MILLION PIXELS 1200 × 1600 |
| HIGH-SPEED PIXEL-AVERAGING TECHNIQUE | 128 | 2672 ms | 2375 ms | 2156 ms | 1938 ms | 1719 ms | 1391 ms |
| HIGH-SPEED PIXEL-AVERAGING TECHNIQUE | 256 | --- | --- | --- | 1922 ms | --- | 1375 ms |
| PIXEL-AVERAGING TECHNIQUE (LOWEST COMMON MULTIPLE) | --- | UNMEASURABLE | UNMEASURABLE | UNMEASURABLE | UNMEASURABLE | UNMEASURABLE | 1046 ms*1 |
| PIXEL-AVERAGING TECHNIQUE (FLOATING POINT) | --- | 2922 ms | 2641 ms | 2390 ms | 2031 ms | 1765 ms | 1422 ms |
| NEAREST NEIGHBOR TECHNIQUE | --- | 1391 ms | 1235 ms | 1125 ms | 1015 ms | 922 ms | 765 ms |
| BILINEAR TECHNIQUE | --- | 2032 ms | 1781 ms | 1562 ms | 1391 ms | 1203 ms | 937 ms |

*1: NUMBER OF PIXELS IN OUTPUT IMAGE Q IS 1224 × 1632

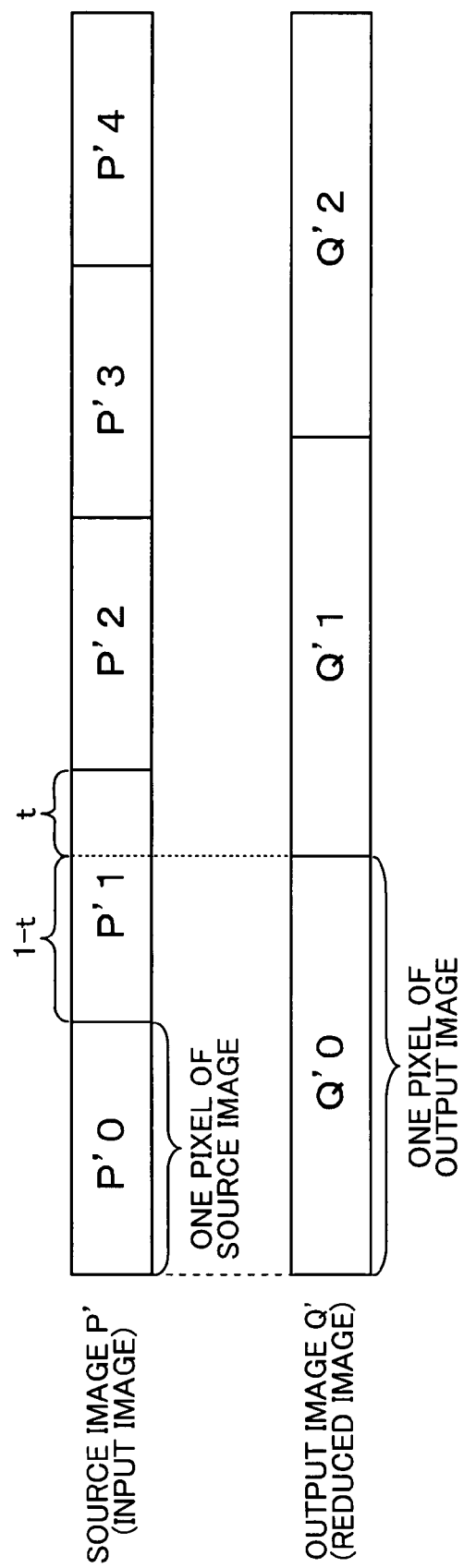

IMAGE PROCESSING DEVICE THAT PRODUCES HIGH-QUALITY REDUCED IMAGE AT FAST PROCESSING SPEED

CROSS REFERENCE TO RELATED APPLICATIONS

This application claims priority from Japanese Patent Application Nos. 2005-347377 filed Nov. 30, 2005 and 2005-347378 filed Nov. 30, 2005. The entire content of each of these priority applications is incorporated herein by reference.

TECHNICAL FIELD

The disclosure relates to an image processing device and program for reducing the size of an image, and particularly to an image processing device and program capable of producing high-quality images at a fast processing rate.

BACKGROUND

Conventionally, the nearest neighbor algorithm, bilinear algorithm (linear interpolation method), bicubic algorithm (cubic interpolation method), pixel-averaging algorithm, and the like have been used to obtain an output image of a size different from that of the input image.

The pixel-averaging algorithm is a method of reducing the size of a source image by averaging pixel values in the source with consideration for the area that the reduced image (output image) occupies in the source image. In most cases, reduced images obtained with the pixel-averaging algorithm are of higher quality than reduced images obtained using other algorithms.

One technique using the pixel-averaging algorithm disclosed in Japanese Patent Application Publication No. 2003-256827 finds average values of pixels after first enlarging the size of the source image to the lowest common multiple of the size of the reduced image.

SUMMARY

Another technique using the pixel-averaging algorithm obtains average values of pixels in source image parts corresponding to the reduced image, without enlarging the size of the source image.

However, while the pixel-averaging technique produces a higher quality image than other algorithms, the technique generally reduces the processing rate. When performing the pixel-averaging technique using the lowest common multiple method in particular, the reduction ratio may make the lowest common multiple (size of the expanded source image) so large that processing is impossible.

The processing speed is better when performing the pixel-averaging technique that obtains an average value of pixels in part of the source image corresponding to the reduced image without expanding the size of the source image than in the method of expanding the size of the source image. However, the processing speed in this technique is still slower than a reduction method using the nearest neighbor algorithm, bilinear algorithm, or other algorithm and should be improved further.

In view of the foregoing, it is an object of one aspect of the invention to provide an image processing device and program capable of executing an image-averaging technique for acquiring a high-quality reduced image at a faster processing speed.

In order to attain the above and other objects, according to one aspect, the invention provides an image processing device. The image processing device includes an inputting section and a reducing section. The inputting section inputs a substantially rectangular source image configured of a plurality of pixels arranged in a first direction and in a second direction substantially perpendicular to the first direction. The plurality of pixels has respective pixel values. The reducing section reduces the source image for obtaining a substantially rectangular output image configured of a plurality of pixels arranged in the first direction and in the second direction. The reducing section includes a reduction-ratio acquiring section, a division-number determining section, a process-block-number calculating section, an average-pixel-value calculating section, and a repeating section. The reduction-ratio acquiring section acquires a reduction ratio for reducing the source image into the output image. The division-number determining section determines a division number nDev for dividing each pixel constituting the source image into (nDev×nDev) division blocks, where nDev is an integer that is greater than or equal to two, and (nDev×nDev) is a square of the division number nDev. The process-block-number calculating section calculates, based on the reduction ratio, a number of division blocks corresponding to a single pixel in the output image. The average-pixel-value calculating section calculates, for the single pixel, an average pixel value based on pixel values of the division blocks. The pixel values of the division blocks are pixels values of corresponding pixels in the source image. The repeating section allows the process-block-number calculating section and the average-pixel-value calculating section to repeat same processes for each of the plurality of pixels in the output image, thereby obtaining an entire output image.

According to another aspect, the invention also provides a storage medium storing a set of program instructions executable on an image processing device. The set of program instructions includes acquiring a reduction ratio for reducing a substantially rectangular source image to obtain a substantially rectangular output image, the source image being configured of a plurality of pixels arranged in a first direction and in a second direction substantially perpendicular to the first direction, the plurality of pixels having respective pixel values, the output image being configured of a plurality of pixels arranged in the first direction and in the second direction, determining a division number nDev for dividing each pixel constituting the source image into (nDev×nDev) division blocks, where nDev is an integer that is greater than or equal to two, and (nDev×nDev) is a square of the division number nDev, calculating, based on the reduction ratio, a number of division blocks corresponding to a single pixel in the output image, calculating, for the single pixel, an average pixel value based on pixel values of the division blocks, the pixel values of the division blocks being pixels values of corresponding pixels in the source image, and repeating same processes of calculating the number of division blocks and calculating the average pixel value for each of the plurality of pixels in the output image, thereby obtaining an entire output image.

BRIEF DESCRIPTION OF THE DRAWINGS

Illustrative aspects in accordance with the invention will be described in detail with reference to the following figures wherein:

FIG. 9 is a flowchart illustrating steps in a reduced pixel outputting process executed during the high-speed pixel-averaging process of FIG. 7;

FIG. 11 is a table comparing processing times when using the high-speed pixel-averaging technique of the illustrative aspects with processing times when using other reducing techniques;

FIG. 12 is an explanatory diagram illustrating a pixel-averaging technique according to a comparative example.

DETAILED DESCRIPTION

An image processing device according to some aspects of the invention will be described while referring to the accompanying drawings.

Figure 1:
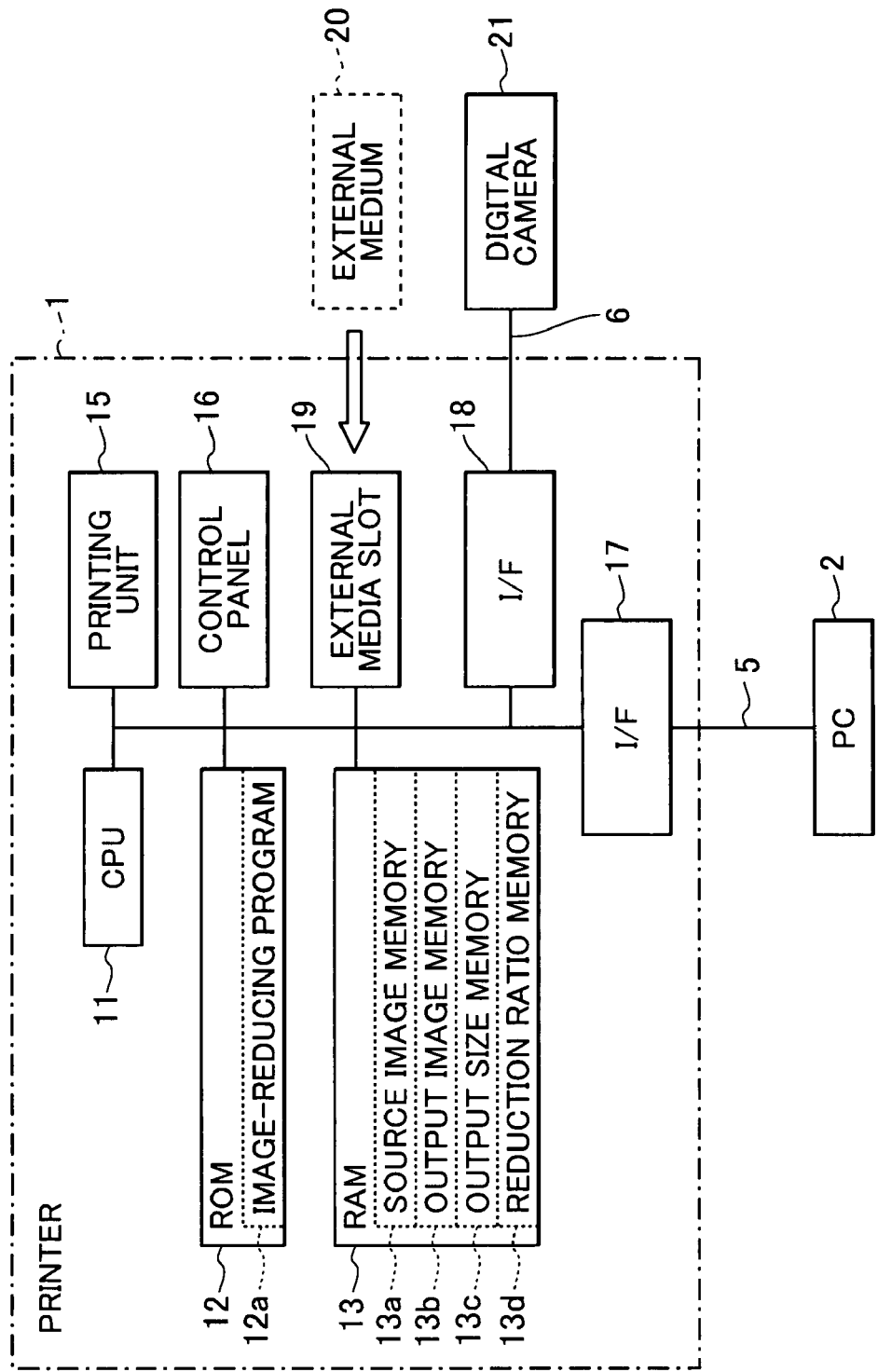
FIG. 1 is a block diagram showing an electrical structure of a printer according to illustrative aspects of the invention.

FIG. 1 is a block diagram showing the electrical structure of a printer 1 according to illustrative aspects. The printer 1 is capable of reducing image data inputted from a personal computer 2, a digital camera 21, or an external medium 20 by a desired reduction ratio and outputting the reduced image data.

The printer 1 includes a CPU (central processing unit) 11, a ROM 12, a RAM 13, a printing unit 15 configured of a print head or the like for printing on paper or another recording medium, and a control panel 16 having a user operating section such as a ten-key pad enabling the user to input the size of an output image and other values.

The printer 1 also includes an interface 17 capable of connecting to the personal computer 2 via a cable 5, an interface 18 capable of connecting to the digital camera 21 via a cable 6, and an external media slot 19 in which the external medium 20 can be detachably mounted. Here, the external medium 20 may be an SD memory card, a Memory Stick, or the like.

Hence, image data stored on the personal computer 2 can be inputted into the printer 1 via the cable 5 and interface 17; image data taken with the digital camera 21 can be inputted into the printer 1 via the cable 6 and interface 18; and image data stored on the external medium 20 can be inputted into the printer 1 when the external medium 20 is mounted in the external media slot 19.

The CPU 11 is a central processing unit (arithmetic device) for controlling all operations of the printer 1. The ROM 12 stores various control programs executed by the CPU 11, and fixed data that the CPU 11 references when executing the control programs. The ROM 12 includes a memory area for storing an image-reducing program 12a for executing a process described in the flowcharts of FIGS. 6 through 10B described later for reducing the size of an image.

The RAM 13 is a rewritable random access memory having a work area provided with various register sets and the like required for the control programs executed by the CPU 11, and a temporary area for temporarily storing data during processing.

The RAM 13 is provided with a source image memory 13a, an output image memory 13b, an output size memory 13c, and a reduction ratio memory 13d. The source image memory 13a functions to store image data inputted from the personal computer 2, digital camera 21, and external medium 20 via the respective interface 17, interface 18, and external media slot 19. This image data is the "source image data" of an image that will be subjected to a reduction process. Hereinafter this image will be referred to as the "source image P."

The output image memory 13b stores "output image data" for an output image referred to in the following description as an "output image Q." The output image Q is generated by reducing the source image data stored in the source image memory 13a based on the image-reducing program 12a. In the illustrative aspects, both the source image data and the output image data are configured of RGB values.

The output size memory 13c stores a size for the output image Q (an output image size) that the user inputs through operations on the control panel 16. The reduction ratio memory 13d stores a reduction ratio calculated from the size of the source image P stored in the source image memory 13a and the output image size stored in the output size memory 13c.

As will be described later, the image-reducing program 12a functions to generate output image data by reducing the source image data stored in the source image memory 13a by the reduction ratio stored in the reduction ratio memory 13d. The output image data generated according to the image-reducing program 12a is stored in the output image memory 13b.

Figure 2:
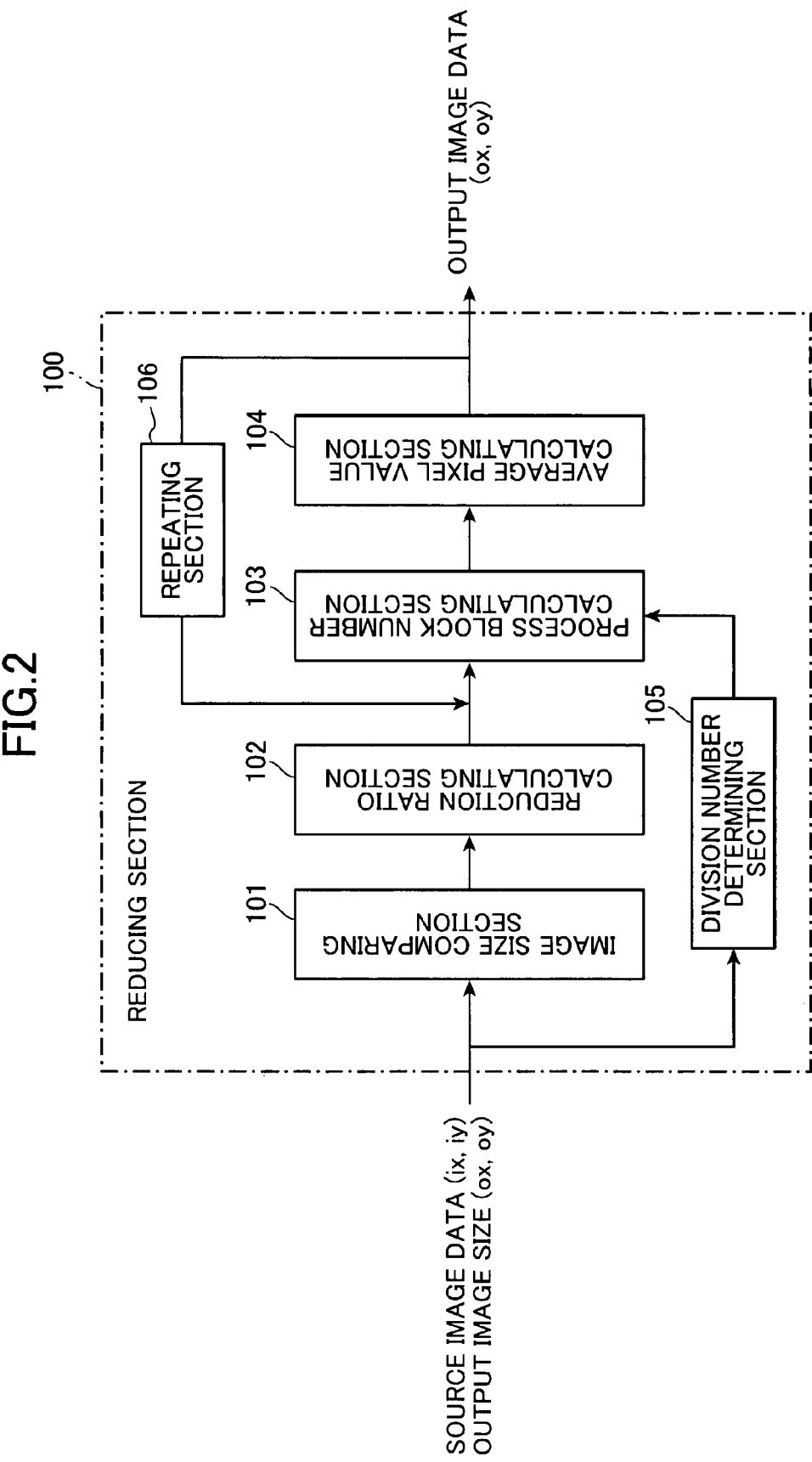
FIG. 2 is a block diagram illustrating a reducing function of the printer according to the illustrative aspects.

Next, a reducing function implemented by the printer 1 having the above-described structure will be described with reference to FIG. 2. FIG. 2 is block diagram illustrating the reducing function of the printer 1. As shown in FIG. 2, the printer 1 includes a reducing section 100 for reducing source image data of the size (ix,iy) inputted from an input device (not shown) to the output image size (ox,oy) inputted from the input device, and outputting the resulting output image data of the size (ox,oy) from an output device (not shown).

More specifically, the reducing section 100 includes an image size comparing section 101, a reduction ratio calculating section 102, a process block number calculating section 103, an average pixel value calculating section 104, a division number determining section 105, and a repeating section 106.

The image size comparing section 101 functions to compare the size (ix,iy) of source image data inputted from the input device with the output image size (ox,oy) and to output the results of this comparison to the reduction ratio calculating section 102. The reduction ratio calculating section 102 functions to calculate a reduction ratio from the comparison results inputted from the image size comparing section 101 and to output the calculated reduction ratio to the process block number calculating section 103. If the image size of the source image P is (ix,iy) and the output image size is (ox,oy), then the reduction ratio is (ox/ix) for the main scanning direction and (oy/iy) for the subscanning direction.

The division number determining section 105 functions to calculate a division number nDev corresponding to one pixel of the source image P based on the source image data inputted from the input device, the output image size, a value representing the processing capacity of the printer 1, and the number of color data (palette) possible for one pixel, and to output the calculated division number nDev to the process block number calculating section 103.

The division number nDev indicates how many times each pixel of the source image P is divided in the main scanning direction (x direction) and the subscanning direction (y direction). Using the division number nDev, each pixel of the source image P is divided into (nDev×nDev) pieces, where individual pieces are referred to as "division blocks." Since the division number nDev is an integer greater than 1, one pixel is divided into (nDev×nDev) division blocks, where (nDev×nDev) is an integer.

However, since the value of the division number nDev must not exceed the processing capacity of the CPU 11, the division number determining section 105 sets the value of the division number nDev within a range that can be processed by the CPU 11. The configuration of the division number determining section 105 for setting the value of the division number nDev in this way will be described later with reference to FIG. 3.

The process block number calculating section 103 functions to calculate the number of division blocks corresponding to one pixel in the output image Q based on the reduction ratio inputted from the reduction ratio calculating section 102 and the division number nDev inputted from the division number determining section 105, and outputs the calculated number of division blocks to the average pixel value calculating section 104.

The average pixel value calculating section 104 functions to calculate an average pixel value in regions of the source image data corresponding to the number of division blocks inputted from the process block number calculating section 103. As will be described later in FIGS. 3 and 4, the average pixel value calculating section 104 calculates the average pixel value by dividing the division blocks included in a single pixel of the output image Q into a plurality of regions.

The repeating section 106 repeats the processes performed by the process block number calculating section 103 and the average pixel value calculating section 104 a number of times equivalent to the number of pixels in the output image Q. After the repeating section 106 has repeated the processes of the process block number calculating section 103 and the average pixel value calculating section 104 for the number of pixels in the entire output image Q, the reducing section 100 outputs from the output device output image data that is based on the source image data inputted from the input device and is reduced to an output image size inputted from the input device.

Figure 3:
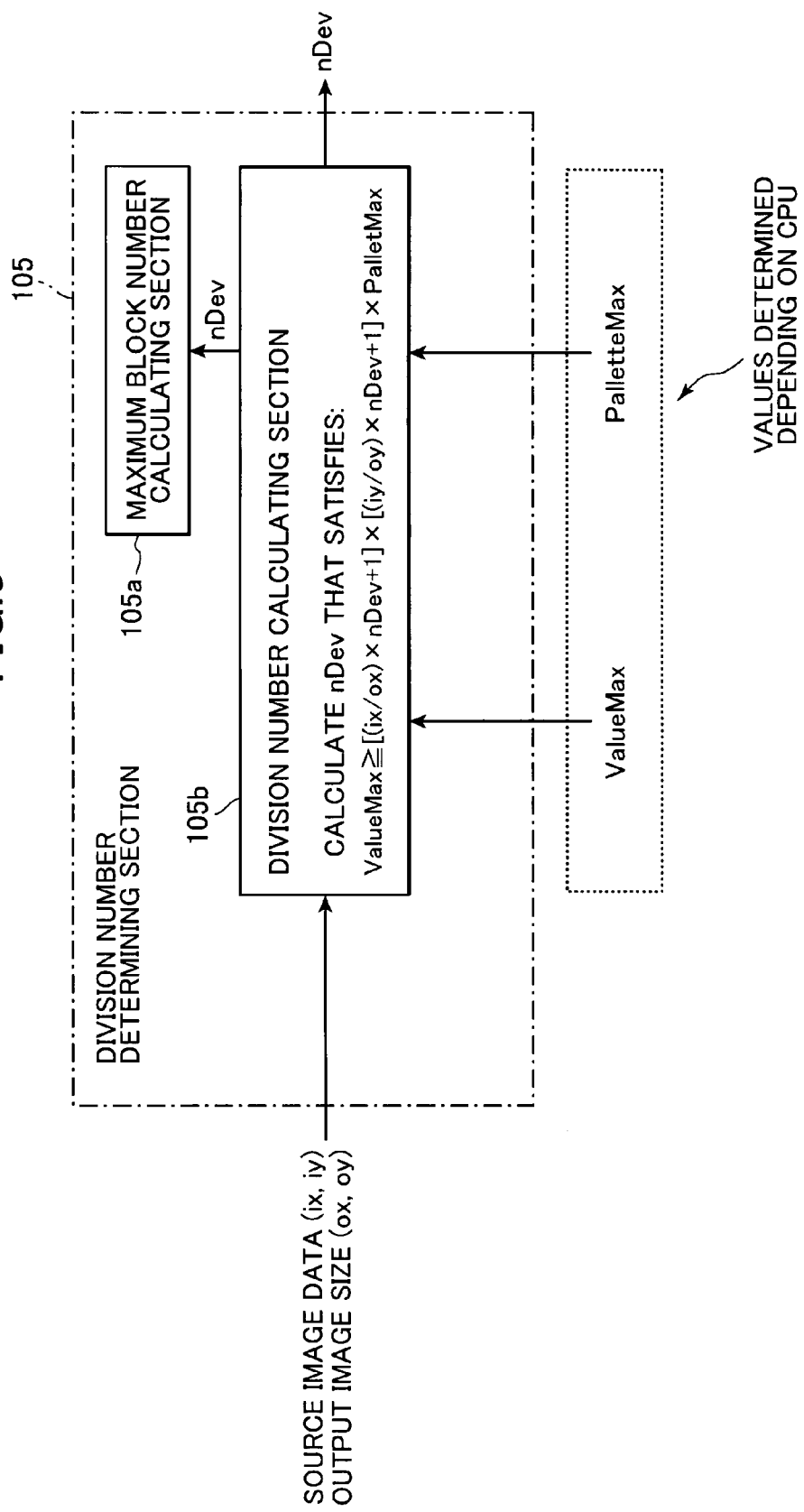
FIG. 3 is a block diagram illustrating the function of a division number determining section in the printer.

Next, a more detailed configuration of the division number determining section 105 will be described with reference to FIG. 3. FIG. 3 is a block diagram illustrating the functions of the division number determining section 105. As shown in FIG. 3, the division number determining section 105 includes a maximum block number calculating section 105*a* and a division number calculating section 105*b*.

The maximum block number calculating section 105*a* functions to calculate the maximum number of division blocks possible for one pixel of the output image Q.

If $(\text{nBlock\_x})_{max}$ and $(\text{nBlock\_y})_{max}$ represent the maximum number of division blocks that are possible in a pixel of the output image Q at coordinate $(i_{out}, j_{out})$ for the main scanning direction and subscanning direction, respectively, (ix×iy) represents the image size (number of pixels) of the source image P, and (ox×oy) represents the image size (number of pixels) of the output image Q, then the values $(\text{nBlock\_x})_{max}$ and $(\text{nBlock\_y})_{max}$ can be expressed with the following equations (1a) and (1b).

$$(n\text{Block\_}x)_{max} = [ix/ox \times n\text{Dev}+1] \qquad (1a)$$

$$(n\text{Block\_}y)_{max} = [iy/oy \times n\text{Dev}+1] \qquad (1b)$$

Here, nBlock_x(0) and nBlock_y(0) denote the number of division blocks in the main scanning direction and subscanning direction, respectively, included in the pixel of the starting coordinate (0,0) in the output image Q. Further, the symbols [] are gaussian symbols representing the maximum integer that does not exceed the value contained with the brackets.

In order for the CPU 11 of the printer 1 to be able to execute the high-speed pixel-averaging process according to the illustrative aspects (S602 in FIG. 6), it is necessary to satisfy the following inequality (2), where ValueMax is the maximum value within the range of values that the CPU 11 can process, and PaletteMax is the maximum number of color data (Palette) possible for one pixel.

$$\text{ValueMax} \geq [(ix/ox) \times n\text{Dev}+1] \times [(iy/oy) \times n\text{Dev}+1] \times \text{PaletteMax} \qquad (2)$$

PaletteMax, which represents the maximum number of colors available for each pixel, is the maximum number of values that can be represented by the number of bits configuring one pixel (such as 8 or 16 bits). Hence, if each pixel is configured of 8 bits, the value of PaletteMax is 256.

Further, since nDev is an integer greater than 1, the following inequality (3) must also be satisfied, where rx is the remainder of ix/ox, ry is the remainder of iy/oy, Dx represents (ix−rx)/ox, and Dy represents (iy−ry)/oy.

$$2 \leq n\text{Dev} \leq \frac{-(Dx+Dy) + \sqrt{(Dx+Dy)^2 - 4DxDy\left(1 - \frac{\text{ValueMax}}{\text{PaletteMax}}\right)}}{2DxDy} \qquad (3)$$

Finding a division number nDev that satisfies the inequality (3), it is possible to reliably prevent overflow in the CPU 11 during a reducing process.

Since the CPU 11 determines the values of ValueMax and PaletteMax here, the division number calculating section 105*b* calculates a division number nDev satisfying the inequality (3) based on the values ValueMax and PaletteMax, the image size (ix×iy) of the source image P, and the image size (ox×oy) of the output image Q. Note that the values Dx and Dy in the inequality (3) can be obtained from the image sizes (ix×iy) and (ox×oy). The division number calculating section 105*b* then outputs the calculated division number nDev to the process block number calculating section 103 and the maximum block number calculating section 105*a*.

Further, when the division number calculating section 105*b* has calculated the division number nDev, the maximum block number calculating section 105*a* calculates the values (nBlock_x)$_{max}$ and (nBlock_y)$_{max}$ from the division number nDev based on the above equations (1a) and (1b).

As described above, the division number nDev is determined for ValueMax, which indicates the maximum processing capacity of the CPU 11, with consideration for the reduction ratio (that is, ox/ix and oy/iy). Hence, when reducing the source image P to various output image sizes, the division number nDev can be appropriately determined in accordance with the reduction ratio, provided that the division number nDev satisfies the inequality (3).

The size of individual division blocks becomes finer (the resolution increases) as the value of the division number nDev increases, thereby reducing errors that can be generated when using division block units and improving the quality of the output image Q. Hence, by using the maximum division number nDev that satisfies the inequality (3) corresponding to the reduction ratio, it is possible to obtain an output image Q having the maximum image quality possible for any reduction ratio.

Further, the division number nDev is set for the maximum value ValueMax within a range defining the processing capacity of the CPU 11 and with consideration for the maximum value of color data (PaletteMax) possible for one pixel. Therefore, it is possible to use a division number nDev that is suitable for the type of color palette.

Figure 4:
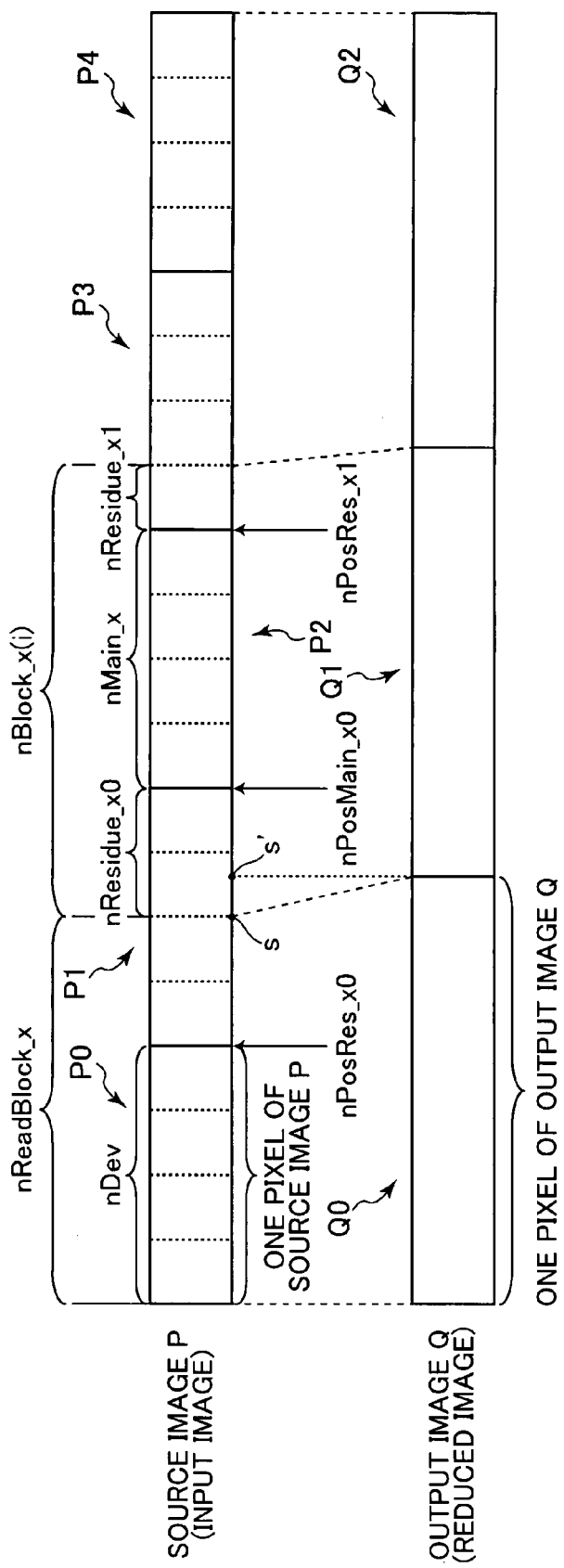
FIG. 4 is an explanatory diagram showing variables used in a high-speed pixel-averaging process.
Figure 5:
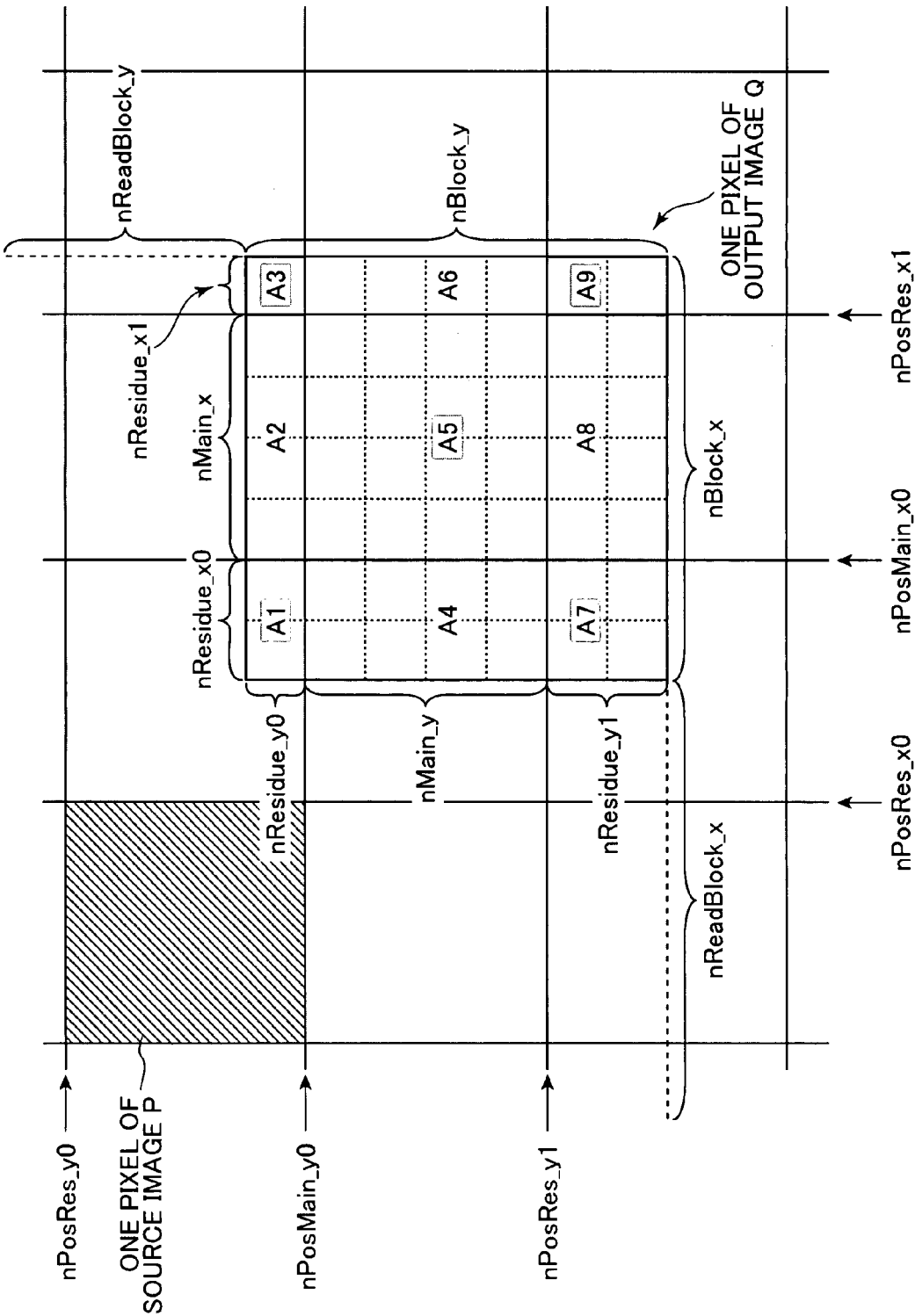
FIG. 5 is another explanatory diagram showing variables used in the high-speed pixel-averaging process.

Before describing the image reducing process of FIG. 6 executed by the printer 1 having the structure described above, variables used in the high-speed pixel-averaging process (S602 of FIG. 6) executed during the image-reducing process will be described with reference to FIGS. 4 and 5. FIGS. 4 and 5 are explanatory diagrams illustrating the variables used in the high-speed pixel-averaging process of the illustrative aspects.

For simplicity sake, the description in FIG. 4 does not consider reduction of the image in the subscanning direction (y direction), but only variables for the main scanning direction (x direction) required for the high-speed pixel-averaging process described later in S602 of FIG. 6. As shown in FIG. 4, the source image P is an image configured of pixels P0-P4 arranged in the main scanning direction, while the output image Q is an image obtained by subjecting the source image P to the image-reducing process described later in FIG. 6.

In the image-reducing process described later, and particularly the high-speed pixel-averaging process, the image is treated in units of division blocks produced by dividing one pixel into an integral number of blocks. As mentioned above in the description of the division number determining section 105 (see FIG. 2), nDev is a variable representing the number of divisions per pixel in the source image P, that is, the number of times each pixel in the source image P is divided. In the example shown in FIG. 4, each pixel of the source image P is divided into four blocks. Hence, the division number nDev is 4 (indicated by the thin dotted lines in FIG. 4).

Here, the value of the division number nDev must fall within a range that can be processed by the CPU 11. Further, the size of individual division blocks becomes smaller (higher resolution) as the value of the division number nDev increases, thereby reducing error produced when using division block units and improving the quality of the output image Q. Accordingly, the division number nDev should be set to the maximum value that can be processed by the CPU 11.

As shown in FIG. 4, the output image Q is the result of reducing the source image P to an output image size of the three pixels Q0-Q2. The pixel Q0 is obtained by reducing the pixel P0 and two division blocks in the pixel P1 adjacent to the pixel P0. The pixel Q1 is obtained by reducing the remaining two division blocks in the pixel P1 not used for the pixel Q0, the pixel P2 adjacent to the pixel P1, and one division block in the pixel P3 adjacent to the pixel P2. The pixel Q2 is obtained by reducing the remaining three division blocks in the pixel P3 not used for the pixel Q1, and the pixel P4 adjacent to the pixel P3.

In the illustrative aspects, since a region of the source image P corresponding to a pixel in the output image Q is obtained in units of division blocks, error is produced between the acquired region and the actual region of the source image P due to the reduction ratio. For example, in FIG. 4 the position of a starting point s' in the region of the source image P corresponding to the actual start of the pixel Q1 according to the reduction ratio differs from the position of a starting point s in a region of the source image P acquired in units of division blocks. However, since the size of the individual division blocks becomes finer (the resolution increases) as the division number nDev increases, there is only a small difference between the positions of the starting point s' and the starting point s described above. As a result, it is possible to suppress a drop in image quality caused by error (difference between the starting points s and s') occurring when using division block units. Therefore, the division number nDev is preferably set to a large value, as described above, and is most preferably set to the largest value that can be processed by the CPU 11.

If pixels at the starting points of the source image P and output image Q are the pixel P0 and the pixel Q0, respectively, then the high-speed pixel-averaging process described later is sequentially executed for pixels Q0 through Q2. FIG. 4 shows an example when this process is performed for obtaining the pixel Q1.

In this example, nBlock_x represents the number of division blocks in the main scanning direction in the region of the source image P corresponding to one pixel of the output image Q. As described above, the pixel Q1 is obtained by reducing the remaining two division blocks in the pixel P1 not used for obtaining the pixel Q0, the pixel P2 adjacent to the pixel P1, and one division block in the pixel P3 adjacent to the pixel P2. Therefore, the variable nBlock_x in the example shown in FIG. 4 is 2+4+1=7.

In the high-speed pixel-averaging process described later, (nBlock_x) division blocks to be reduced in the main scanning direction are divided into three segments. More specifically, the division blocks being processed are divided into division blocks included in a remaining region of the source image P smaller than one pixel that was not processed in the previous high-speed pixel-averaging process (hereinafter referred to as the "front residual region"); division blocks included in a region of the source image P adjacent to the front residual region and including N complete pixels, where N is an integer greater than 0 (hereinafter referred to as the "middle region"); and division blocks included in a remaining region of the source image P smaller than one pixel that is adjacent to the middle region and not included in either the front residual region or the middle region within the number of division blocks represented by the variable nBlock_x (hereinafter referred to as the "rear residual region").

Here, nResidue_x0 is a variable representing the number of division blocks in the main scanning direction included in the front residual region; nMain_x is a variable representing the number of pixels in the main scanning direction included in the middle region; and nResidue_x1 is a variable representing the number of division blocks in the main scanning direction included in the rear residual region.

In the example shown in FIG. 4, the variable nResidue_x0 is 2, since there are two division blocks in the main scanning direction corresponding to the remaining portion of the pixel P1 not used for deriving the pixel Q0. The variable nMain_x is the value 1, since the middle region includes only the pixel P2. Further, the variable nResidue_x1 is the value 1 for the single division block in the pixel P3 adjacent to the pixel P2 in the main scanning direction.

Also in FIG. 4, nPosRes_x0 is a variable representing the coordinate in the main scanning direction of the source image P corresponding to the pixel including the front residual region. nPosMain_x0 is a variable representing the coordinate in the main scanning direction of the source image P corresponding to the initial pixel (the pixel adjacent to the front residual region) among the N pixels included in the middle region. nPosRes_x1 is a variable representing the coordinate in the main scanning direction of the source image P corresponding to the pixel including the rear residual region.

In the example shown in FIG. 4, the variable nPosRes_x0 is the coordinate in the main scanning direction corresponding to the pixel P1 including the front residual region. The variable nPosMain_x0 is the coordinate in the main scanning direction corresponding to the pixel P2, which is the only pixel included in the middle region. The variable nPosRes_x1 is the coordinate in the main scanning direction corresponding to the pixel P3 including the rear residual region.

Further, nReadBlock_x is a variable representing the number of division blocks in the main scanning direction that have already undergone the high-speed pixel-averaging process. Since division blocks corresponding to the pixel Q0 have already been processed in the example of FIG. 4, the variable nReadBlock_x is set to the number of division blocks in the main scanning direction included in the region of the source image P corresponding to the pixel Q0, that is, 4+2=6.

For simplification purposes, the above description includes only variables required for reducing an image in the main scanning direction (x direction). However, in reality the image is also reduced in the subscanning direction (y direction). FIG. 5 shows an example that considers reduction in the subscanning direction. FIG. 5 illustrates a pixel of the output image Q overlapping pixels of the source image P. To help differentiate these pixels, only one pixel of the output image Q currently being processed is displayed in FIG. 5, while one pixel of the source image P is indicated with hatch marks.

As shown in FIG. 5, since the source image P is divided by a division number nDev of 4 in both the main scanning direction and the subscanning direction, each pixel of the source image P is divided into 16 (nDev×nDev) division blocks, indicated by thin dotted lines in FIG. 5.

In this example, nBlock_y is a variable required for reducing the image in the subscanning direction that corresponds to the variable nBlock_x required for reducing the image in the main scanning direction. In other words, the variable nBlock_y represents the number of division blocks in the subscanning direction included in a region of the source image P corresponding to one pixel of the output image Q.

Further, a variable nReadBlock_y corresponds to the variable nReadBlock_x required for reducing the image in the main scanning direction. Hence, the variable nReadBlock_y represents the number of division blocks in the subscanning direction that have already undergone the high-speed pixel-averaging process.

As described above for the main scanning direction, the high-speed pixel-averaging process described later is performed to divide (nBlock_y) division blocks to be reduced in the subscanning direction into three segments, including a front residual region, a middle region, and a rear residual region.

A variable nResidue_y0 corresponds to the variable nResidue_x0 required for reducing the image in the main scanning direction and, hence, represents the number of division blocks in the subscanning direction included in the front residual region. Further, a variable nMain_y corresponds to the variable nMain_x required for reducing the image in the main scanning direction and, hence, represents the number of pixels in the subscanning direction included in the middle region. Further, a variable nResidue_y1 corresponds to the variable nResidue_x1 required for reducing the image in the main scanning direction and, hence, represents the number of division blocks in the subscanning direction included in the rear residual region.

As shown in FIG. 5, (nBlock_x)×(nBlock_y) division blocks are divided into three segments in the main scanning direction (nResidue_x0, nMain_x, nResidue_x1) and three segments in the subscanning direction (nResidue_y0, nMain_y, nResidue_y1), resulting in nine regions A1-A9.

Further, a variable nPosRes_y0 corresponds to the variable nPosRes_x0 required for reducing the image in the main scanning direction and, hence, represents the coordinate in the subscanning direction of the source image P corresponding to the pixel including the front residual region. Further, a variable nPosMain_y0 corresponds to the variable nPosMain_x0 required for reducing the image in the main scanning direction and, hence, represents the coordinate in the subscanning direction of the source image P corresponding to the initial pixel (pixel adjacent to the front residual region) among M pixels included in the middle region, where M is an integer greater than 0. A variable nPosRes_y1 corresponds to the variable nPosRes_x1 required for reducing the image in the main scanning direction and, hence, represents the coordinate in the subscanning direction of the source image P corresponding to the pixel including the rear residual region.

The number of division blocks included in the region A1 is (nResidue_x0×nResidue_y0); the number of division blocks included in the region A2 is (nMain_x×nResidue_y0); and the number of division blocks included in the region A3 is (nResidue_x1×nResidue_y0).

Similarly, the number of division blocks included in the region A4 is (nResidue_x0×nMain_y×nDev); the number of division blocks included in the region A5 is (nMain_x×nMain_y×nDev$^2$); and the number of division blocks included in the region A6 is (nResidue_x1×nMain_y×nDev).

Further, the number of division blocks included in the region A7 is (nResidue_x0×nResidue_y1); the number of division blocks included in the region A8 is (nMain_x×nDev×nResidue_y1); and the number of division blocks included in the region A9 is (nResidue_x1×nResidue_y1).

In the high-speed pixel-averaging process of the illustrative aspects described later, the reducing section 100 divides each pixel in the source image P into nDev division blocks and processes the image in division block units to acquire a value for one pixel in the output image Q, without expanding the lowest common multiple and without performing floating point operations. Accordingly, the printer 1 of the illustrative aspects can increase the processing speed for reducing an image using the pixel-averaging technique.

Next, the pixel-reducing process executed by the printer 1 having the structure described above will be described with reference to the flowchart in FIG. 6. FIG. 6 is a flowchart illustrating steps in the image-reducing process. The image-reducing process is started when a substantially rectangular source image P (source image data) having a (ix×iy) image size (number of pixels) is inputted into the printer 1. More specifically, this process begins when the digital camera 21 inputs the source image P via the cable 6 and the interface 18, for example.

Figure 6:
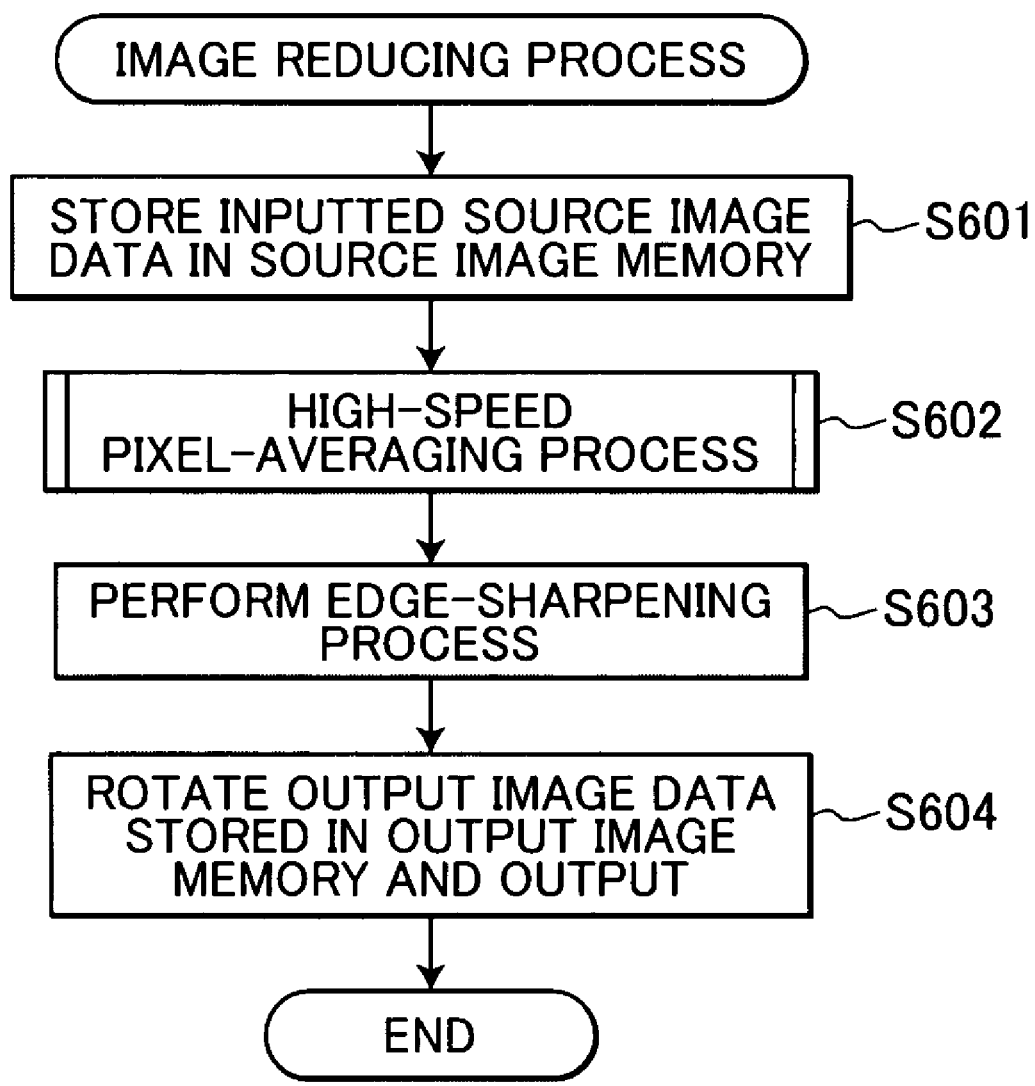
FIG. 6 is a flowchart illustrating steps in a reducing process executed by the printer.

In S601 of the image-reducing process shown in FIG. 6, the CPU 11 stores the source image data inputted into the printer 1 in the source image memory 13*a*. In S602 the CPU 11 executes the high-speed pixel-averaging process for producing substantially rectangular output image data (output image Q) having the output image size (ox×oy) inputted by the user by using a high-speed pixel-averaging technique to reduce the source image data stored in the source image memory 13*a* to the output image size of (ox×oy). The high-speed pixel-averaging process of S602 is described later with reference to FIG. 7.

After executing the high-speed pixel-averaging process in S602, in S603 the CPU 11 performs an edge-sharpening process on the output image data acquired in S602. The edge-sharpening process performed in S603 is a technique well known in the art. Therefore, a detailed description of this process has been omitted. However, as an example, a sharpening filter such as a Laplacian filter configured of a 3×3 matrix may be used to process each pixel value of the output image data.

In S604 the CPU 11 rotates the output image data stored in the output image memory 13*b* and outputs this data to the printing unit 15. Subsequently, the image-reducing process ends. As a result of the process in S604, the output image Q produced by reducing the source image P to the output image size specified by the user is printed on a recording medium.

Figure 7:
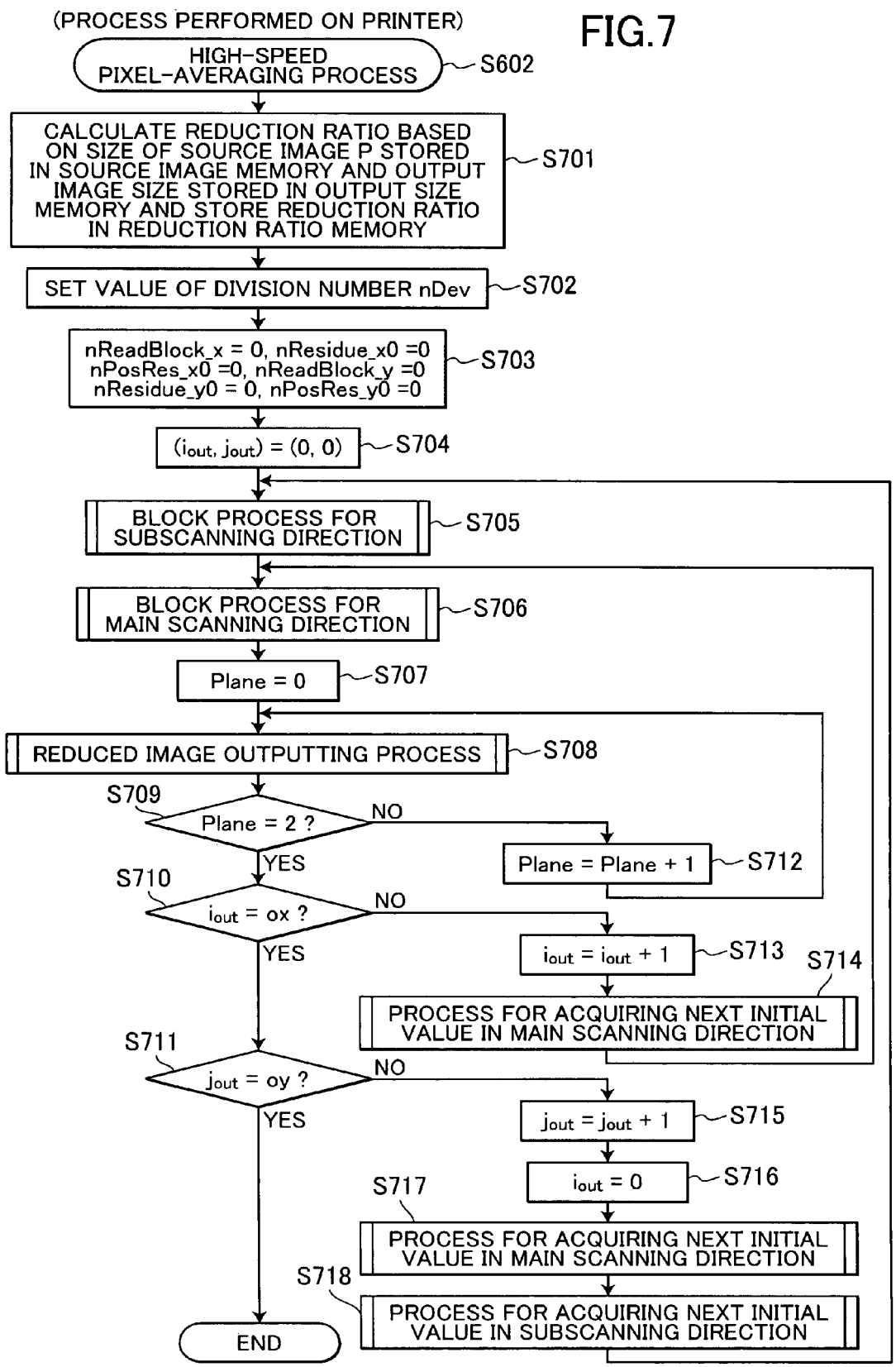
FIG. 7 is a flowchart illustrating steps in the high-speed pixel-averaging process executed during the reducing process in FIG. 6.

Next, the high-speed pixel-averaging process of S602 executed in the image-reducing process of FIG. 6 will be described with reference to the flowchart in FIG. 7. FIG. 7 is a flowchart illustrating steps in the high-speed pixel-averaging process.

In S701 of FIG. 7 the CPU 11 calculates a reduction ratio from the image size (ix×iy) of the source image P stored in the source image memory 13*a*, and the output image size stored in the output size memory 13*c*, and stores the reduction ratio in the reduction ratio memory 13*d*. The output image size (ox×oy) stored in the output size memory 13*c* is a value that the user inputs separately through the control panel 16.

In S702 the CPU 11 calculates the division number nDev. In the illustrative aspects, the CPU 11 calculates a division number nDev that can produce the highest possible quality of the output image Q. Specifically, the CPU 11 obtains a division number nDev in S702 using the following equation (4).

$$nDev = \left\lceil \frac{-(Dx + Dy) + \sqrt{(Dx + Dy)^2 - 4DxDy\left(1 - \frac{ValueMax}{PaletteMax}\right)}}{2DxDy} \right\rceil \quad (4)$$

Here, Dx is (ix−rx)/ox, rx is the remainder of ix/ox, Dy is (iy−ry)/oy, ry is the remainder of iy/oy, ValueMax is the maximum value among values indicating the processing capacity of the image processing device, and PaletteMax is the maximum value of color data that can be assigned to a single pixel.

Since the division number nDev obtained using equation (4) is the maximum value that satisfies the inequality (3) described above, this method can reliably prevent overflow in the CPU 11 during the reduction process and produces a reduced image of the highest possible quality that the CPU 11 can produce.

After completing the process in S702, in S703 the CPU 11 initializes all the variables nReadBlock_x, nResidue_x0, nPosRes_x0, nReadBlock_y, nResidue_y0, and nPosRes_y0 to 0. In S704 the CPU 11 sets the coordinate $i_{out}$ for the main scanning direction and the coordinate $j_{out}$ for the subscanning direction to the starting coordinates (0,0) indicating the first pixel in the output image Q.

In S705 the CPU 11 executes a block process for the subscanning direction. While described later with reference to FIG. 8A, the block process for the subscanning direction in S705 is executed to obtain all of the variables nBlock_y, nMain_y, nResidue_y1, nPosMain_y0, and nPosRes_y1 in the subscanning direction as integer values for the source image P corresponding to the pixel of the output image Q located at coordinates ($i_{out}$,$j_{out}$).

After completing the block process for the subscanning direction in S705, in S706 the CPU 11 executes a block process for the main scanning direction. As will be described later with reference to FIG. 8B, the block process for the main scanning direction in S706 is executed to obtain all of the variables nBlock_x, nMain_x, nResidue_x1, nPosMain_x0, and nPosRes_x1 in the main scanning direction as integer values for the source image P corresponding to the pixel of the output image Q located at the coordinates ($i_{out}$,$j_{out}$).

After completing the block process for the main scanning direction in S706, in S707 the CPU 11 sets a variable Plane to 0. Since the image data is configured of RGB values in the illustrative aspects, the variable Plane can be assigned one of three values from 0 to 2 for specifying a color plane. Specifically, Plane=0 specifies the red (R) plane, Plane=1 specifies the green (G) plane, and Plane=2 specifies the blue (B) plane.

In S708 the CPU 11 performs a reduced image outputting process for acquiring pixel values of the color plane corresponding to the Plane value set in S707 or S712 described later. While described later in detail with reference to FIG. 9, the reduced image outputting process of S708 is performed to calculate an average pixel value of the color plane specified by the Plane value in a region of the source image P corresponding to a pixel in the output image Q at the coordinates ($i_{out}$,$j_{out}$).

In S709 the CPU 11 determines whether the variable Plane is 2. If the variable Plane is 0 or 1 (S709: NO), then in S712 the CPU 11 increments the variable Plane by 1 and returns to the reduced image outputting process of S708. Hence, the CPU 11 repeats the reduced image outputting process for the color plane corresponding to the next plane value.

However, if the CPU 11 determines in S709 that the variable Plane is set to the value 2 (S709: YES), then pixel values have been acquired for all color planes RGB in the pixel at the coordinate ($i_{out}$,$j_{out}$). Therefore, in S710 the CPU 11 determines whether $i_{out}$=ox, that is, whether the pixel at the coordinates ($i_{out}$,$j_{out}$) is the last pixel in the main scanning direction.

If $i_{out}$ does not equal ox (S710: NO), then in S713 the CPU 11 increments the value of $i_{out}$ to advance the pixel of the output image Q in the main scanning direction and in S714 executes a process for acquiring the next initial value in the main scanning direction. While this process is described in greater detail with reference to FIG. 10A, the process of S714 updates the values assigned to variables nReadBlock_x, nResidue_x0, and nPosRes_x0.

After executing the process for acquiring the next initial value in the main scanning direction of S714, the CPU 11 returns to the block process in the main scanning direction in S706. Here, the CPU 11 acquires the variables nBlock_x, nMain_x, nResidue_x1, nPosMain_x0, and nPosRes_x1 corresponding to the new pixel in the output image Q, which was advanced in the main scanning direction in S713.

However, if the CPU 11 determines that $i_{out}$=ox in S710 (S710: YES), then the reduced image outputting process of S708 has been executed for all pixels positioned at the same coordinate $j_{out}$ in the subscanning direction. Therefore, in S711 the CPU 11 determines whether $j_{out}$=oy, that is, whether the pixel of the output image Q at the coordinates ($i_{out}$,$j_{out}$) is the final pixel in the subscanning direction.

If $j_{out}$ does not equal oy (S711: NO), then in S715 the CPU 11 increments the value of $j_{out}$ and in S716 sets the value of $i_{out}$ to 0. The processes of S715 and S716 advance the position of the selected pixel in the output image Q one place in the subscanning direction and return the position to the beginning coordinate in the main scanning direction.

In S717 the CPU 11 executes a process for acquiring the next initial value in the main scanning direction. While this process is described in greater detail with reference to FIG. 10A, the process of S717 updates the variables nReadBlock_x, nResidue_x0, and nPosRes_x0.

In S718 the CPU 11 executes the process to acquire the next initial value in the subscanning direction. The process performed in S718 acquires values for the variables nReadBlock_y, nResidue_y0, and nPosRes_y0. While described in greater detail with reference to FIG. 10B, since this process of S718 is performed on the starting coordinate in the subscanning direction of the output image Q, the CPU 11 sets all of the variables nReadBlock_y, nResidue_y0, and nPosRes_y0 to 0.

After completing the process for acquiring the next initial value in the subscanning direction of S718, the CPU 11 returns to the block process for the subscanning direction in S705. In the process of S705 the CPU 11 acquires values for the variables nBlock_y, nMain_y, nResidue_y1, nPosMain_y0, and nPosRes_y1 corresponding to the current pixel in the output image Q, which was advanced one place in the subscanning direction in S715.

However, if the CPU 11 determines that $j_{out}$=oy in S711 (S711: YES), then the reduced image outputting process of S708 has been executed to obtain values for all (ox×oy) pixels in the output image Q. Accordingly, the high-speed pixel-averaging process of S602 ends. By performing this process in S602, output image data for the output image Q having an output image size (ox×oy) acquired by reducing the source image P of the source image size (ix×iy) is stored in the output image memory 13b.

Figure 8A:
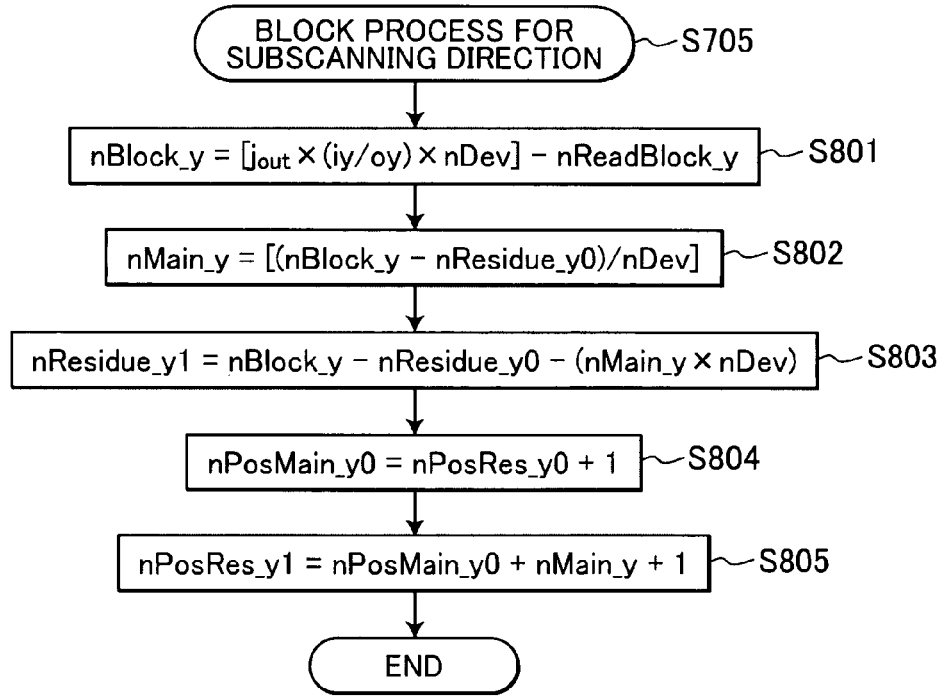
FIG. 8A is a flowchart illustrating steps in a subscanning block process executed during the high-speed pixel-averaging process of FIG. 7.
Figure 8B:
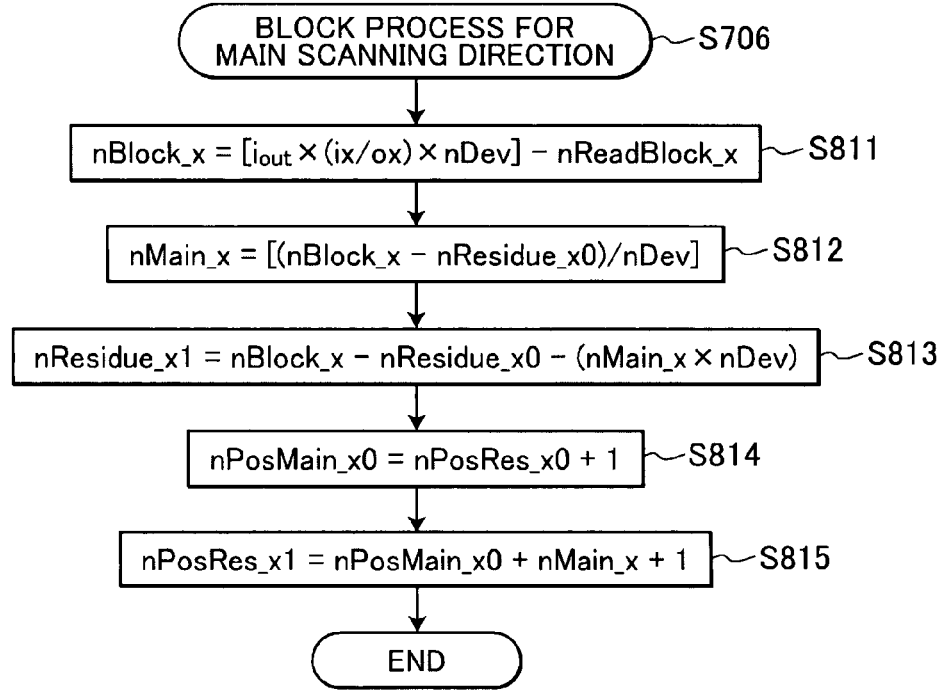
FIG. 8B is a flowchart illustrating steps in a main scanning block process executed during the high-speed pixel-averaging process of FIG. 7.

Next, the block process for the subscanning direction in S705 and the block process for the main scanning direction in S706 executed during the high-speed pixel-averaging process described above in FIG. 7 will be described with reference to the flowcharts in FIGS. 8A and 8B. FIG. 8A is a flowchart illustrating steps in the block process for the subscanning direction (S705), while FIG. 8B is a flowchart illustrating steps in the block process for the main scanning direction (S706).

As shown in FIG. 8A, in S801 of the block process of S705 the CPU 11 finds the value of the variable nBlock_y from the equation nBlock_y=[$j_{out}$×(iy/oy)×nDev]−nReadBlock_y.

The process in S801 serves to extract (nBlock_y) division blocks in the subscanning direction for one pixel of the output image Q that are adjacent to division blocks in the subscanning direction already processed in S602.

Since the end point in the subscanning direction of the division blocks for one pixel of the output image Q is found by truncating numbers to the right of the decimal (the fractional part) according to the gaussian symbol and is not dependent on the reduction ratio for the subscanning direction (oy/iy), the variable nBlock_y can be expressed as a number of division blocks, that is, as an integer.

After completing the process in S801, in S802 the CPU 11 uses the variable nBlock_y found in S801 to find the variable nMain_y in the equation nMain_y=[(nBlock_y−nResidue_y0)/nDev].

In S803 the CPU 11 uses the variable nMain_y found in S802 to find the variable nResidue_y1 in the equation nResidue_y1=nBlock_y−nResidue_y0−(nMain_y×nDev).

In S804 the CPU 11 finds the value of the variable nPosMain_y0 from the equation nPosMain_y0=nPosRes_y0+1. In S805 the CPU 11 uses the value of nPosMain_y0 found in S804 to find the variable nPosRes_y1 in the equation nPosRes_y1=nPosMain_y0+nMain_y+1. Subsequently, the block process for the subscanning direction in S705 ends.

As shown in FIG. 8B, in S811 of the block process of S706 the CPU 11 finds the value of the variable nBlock_x from the equation nBlock_x=[$i_{out}$×(ix/ox)×nDev]−nReadBlock_x.

The process in S811 serves to extract (nBlock_x) division blocks in the main scanning direction for one pixel of the output image Q that are adjacent to division blocks in the main scanning direction already processed in S602.

Since the end point in the main scanning direction of the division blocks for one pixel of the output image Q is found by truncating numbers to the right of the decimal according to the gaussian symbol and is not dependent on the reduction ratio for the main scanning direction (ox/ix), the variable nBlock_x can be expressed as a number of division blocks, that is, as an integer.

After completing the process in S811, in S812 the CPU 11 uses the variable nBlock_x found in S811 to find the variable nMain_x in the equation nMain_x=[(nBlock_x−nResidue_x0)/nDev].

In S813 the CPU 11 uses the variable nMain_x found in S812 to find the variable nResidue_x1 in the equation nResidue_x1=nBlock_x−nResidue_x0−(nMain_x×nDev).

In S814 the CPU 11 finds the value of the variable nPosMain_x0 from the equation nPosMain_x0=nPosRes_x0+1. In S815 the CPU 11 uses the value of nPosMain_x0 found in S814 to find the variable nPosRes_x1 in the equation nPosRes_x1=nPosMain_x0+nMain_x+1. Subsequently, the block process for the main scanning direction in S706 ends.

By performing the block processes in S705 and S706, the pixel at coordinates ($i_{out}$,$j_{out}$) in the output image Q is divided into regions A1-A9 (see FIG. 5).

Since the pixel of the output image Q at coordinates ($i_{out}$, $j_{out}$) is divided into the region A5 configured of a complete pixel in the source image P, and regions A1-A4 and A6-A9 that are less than one pixel in the source image P, the division block number for the regions A1-A4 and A6-A9 can easily be calculated by calculating the (number of division blocks in the main scanning direction×number of division blocks in the subscanning direction) for each region. This construction facilitates calculations of partial pixel values for each region (see S901) and calculations for the final average pixel value (S903) in the reduced pixel outputting process of S708 described next with reference to FIG. 9.

Further, since any values to the right of the decimal point are truncated in the equations of S801 and S811, the variables nBlock_x and nBlock_y can be expressed as integers without depending on the reduction ratio (ox/ix) for the main scanning direction and the reduction ratio (oy/iy) for the subscanning direction. As a result, the average pixel values can be calculated according to integer arithmetic in the reduced pixel outputting process of S708 described next with reference to FIG. 9, thereby improving the processing speed (process time).

As a result of performing processes in S801 and S811, the number of division blocks nBlock_x in the main scanning direction and the number of division blocks nBlock_y in the subscanning direction for a single pixel in the output image Q are used in the high-speed pixel-averaging process of S602 to extract the division block neighboring division blocks that have already been processed as the starting point. Consequently, all image data included in the source image P is used to calculate the average pixel value in the reduced pixel outputting process of S708 described next, thereby suppressing a drop in image quality during the reduction process.

Next, the reduced pixel outputting process of S708 executed in the high-speed pixel-averaging process of FIG. 7 will be described with reference to FIG. 9. FIG. 9 is a flowchart illustrating steps in the process of S708.

In S901 of FIG. 9, the CPU 11 calculates a partial pixel value for the color plane corresponding to the plane value for each region divided as a result of the block processes of S706 and S705. In the illustrative aspects, "partial pixel value" signifies a value obtained through the summation of (pixel value of the color plane corresponding to the variable Plane× number of division blocks included in the pixel) for each region.

For example, the partial pixel value of the region A1 can be obtained in S901 from (the pixel value of the color plane corresponding to the plane value in the region A1×the number of division blocks included in the region A1), that is, (the pixel value of the color plane corresponding to the plane value of the pixel at coordinates (nResidue_x0, nResidue_y0) of the source image P×nResidue_x0 ×nResidue_y0). If the value of nResidue_x0 is 0 at this time, then the partial pixel value of the region A1 is calculated to be 0.

In S902 the CPU 11 totals the partial pixel values calculated for each region in S901. In S903 the CPU 11 calculates the average pixel value by dividing the total value obtained in S902 by the total number of division blocks included in the pixels being processed (nBlock_x×nBlock_y).

In S904 the CPU 11 stores the average pixel value calculated in S903 in the output image memory 13$b$ as the value of the pixel at coordinates ($i_{out}$, $j_{out}$) in the output image Q, and subsequently ends the reduced pixel outputting process of S708.

Hence, each time the reduced pixel outputting process of S708 is executed, a value for one pixel of the output image Q at the coordinates ($i_{out}$, $j_{out}$) is stored in the output image memory 13$b$. Here, the value of a single pixel in the output image Q stored in the output image memory 13$b$ is the average pixel value of a region in the source image P corresponding to that pixel.

Figure 10A:
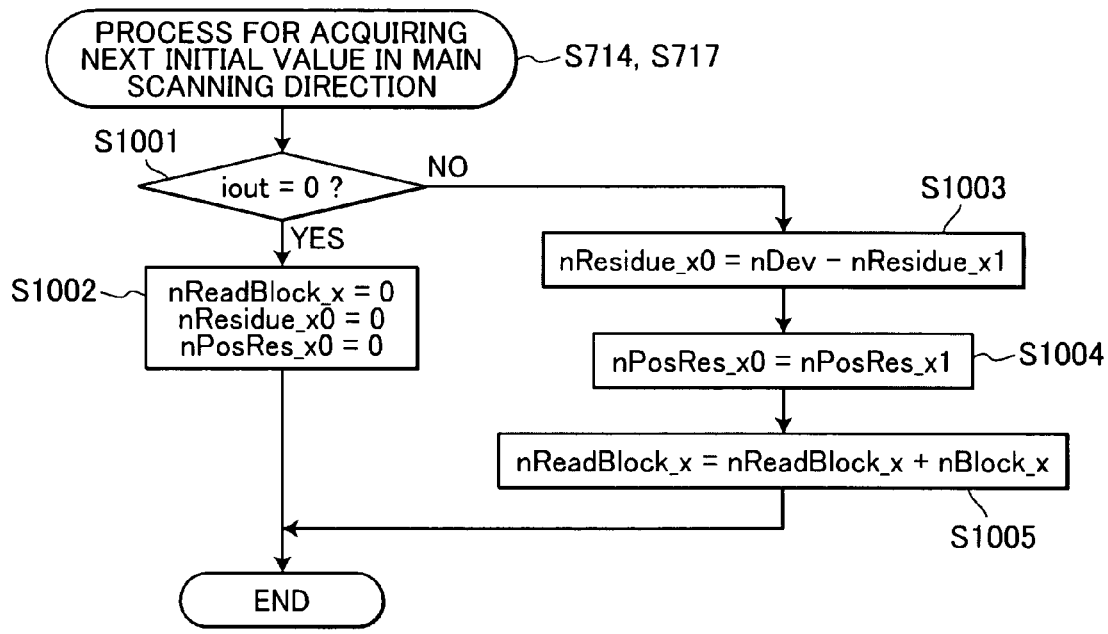
FIG. 10A is a flowchart illustrating steps in a process for acquiring the next initial value in the main scanning direction executed during the high-speed pixel-averaging process of FIG. 7.
Figure 10B:
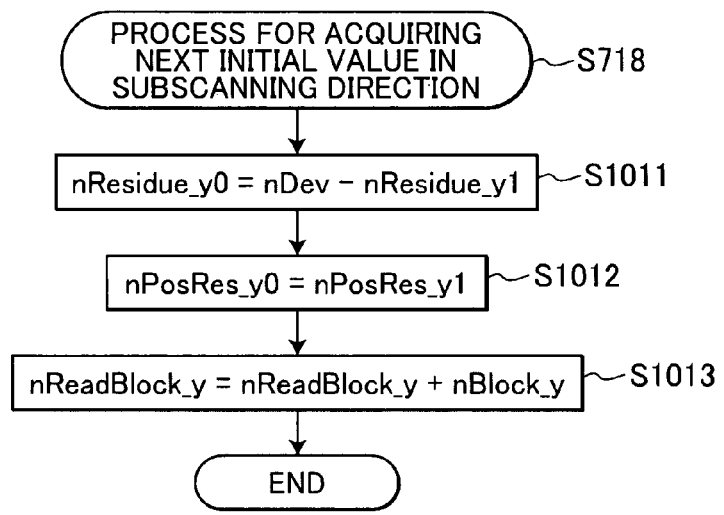
FIG. 10B is a flowchart illustrating steps in a process for acquiring the next initial value in the subscanning direction executed during the high-speed pixel-averaging process of FIG. 7.

Next, the process for acquiring the next initial value in the main scanning direction (S714 and S717) and the process for acquiring the next initial value in the subscanning direction (S718) executed in the high-speed pixel-averaging process of FIG. 7 will be described with reference to FIGS. 10A and 10B. FIG. 10A is a flowchart illustrating steps in the process for acquiring the next initial value in the main scanning direction, while FIG. 10B is a flowchart illustrating steps in the process for acquiring the next initial value in the subscanning direction.

In S1001 of FIG. 10A, the CPU 11 determines whether $i_{out}$=0. If $i_{out}$=0 (S1001: YES), then in S1002 the CPU 11 sets each of the variables nReadBlock_x, nResidue_x0, and nPosRes_x0 to 0. Subsequently, the process of S714 or S717 ends.

However, if the CPU 11 determines that the value of $i_{out}$ is not 0 (S1001: NO), then in S1003 the CPU 11 finds the value of the variable nResidue_x0 from the equation nResidue_x0=nDev−nResidue_x1.

In S1004 the CPU 11 finds the variable nPosRes_x0 from the equation nPosRes_x0=nPosRes_x1. In S1005 the CPU 11 finds the variable nReadBlock_x from the equation nReadBlock_x=nReadBlock_x+nBlock_x. Subsequently, the process of S714 or S717 ends.

In S1011 of FIG. 10B, the CPU 11 first finds the value of the variable nResidue_y0 from the equation nResidue_y0=nDev−nResidue_y1.

In S1012 the CPU 11 finds the variable nPosRes_y0 from the equation nPosRes_y0=nPosRes_y1. In S1013 the CPU 11 finds the value of the variable nReadBlock_y from the equation nReadBlock_y=nReadBlock_y+nBlock_y. Subsequently, the process of S718 ends.

The processes in S714, S717, and S718 function to acquire the next variables nReadBlock_x, nResidue_x0, nPosRes_x0, nReadBlock_y, nResidue_y0, and nPosRes_y0 required for executing the next block processes in S706 and S705.

Finding the variables nPosRes_x0 and nPosRes_y0 are particularly useful in identifying the pixel position (coordinates of the pixel) in the source image P corresponding to the regions A1-A9 for the pixel of the output image Q being processed next. This simplifies the average pixel calculation in the reduced pixel outputting process of S708 described above, even for regions of the source image P that are smaller than one pixel (A1-A4 and A6-A9).

Next, the advantages of using the image-reducing process of the illustrative aspects (FIG. 5) including the high-speed pixel-averaging process described above (S502) will be demonstrated with reference to FIG. 11. The technique for reducing an image in the image-reducing process of the illustrative aspects will be referred to in the following description as the "high-speed pixel-averaging technique." FIG. 11 is a table comparing the processing time required when using the high-speed pixel-averaging technique of the illustrative aspects and the processing time when using other reducing techniques.

FIG. 11 shows the processing times resulting from using these various reducing techniques to reduce a source image P (natural image) having eight million pixels (2448×3264) to a output image Q of various image sizes.

When performing these reduction processes, a Pentium 4 of 3.4 GHz processor (Pentium is a registered trademark) was used as the CPU corresponding to the CPU 11 of the illustrative aspects, while two gigabytes of RAM were used as the memory corresponding to the RAM 13 of the illustrative aspects.

As shown in FIG. 11 the output image Q was set at various image sizes including two million pixels (1200×1600), three million pixels (1536×2048), four million pixels (1728×2304), five million pixels (1920×2560), six million pixels (2112×2816), and 7 million pixels (2304×3072).

As shown in FIG. 11, the processing time required to obtain the output image Q of two million, three million, four million, five million, six million, and seven million pixels when using the high-speed pixel-averaging technique of the illustrative aspects (division number nDev=128) was 1391 ms, 1719 ms, 1938 ms, 2156 ms, 2375 ms, and 2672 ms, respectively.

When using the pixel-averaging technique employing the lowest common multiple (image-averaging technique (lowest common multiple) in FIG. 11), only a processing time of 1046 ms was obtained for the two million pixel output image Q, while processing was not completed for the output images Q of image sizes three million-seven million pixels (processing not possible).

While the processing time required to obtain the output image Q of two million pixels was shorter using the pixel-averaging technique (lowest common multiple) than when using the high-speed pixel-averaging technique of the illustrative aspects, the image size of the output image Q (1224×1632) is exactly half the image size of the source image P (2448×3264) in both dimensions. As a result, the value of the lowest common multiple is the image size of the source image P.

Hence, the pixel-averaging technique (lowest common multiple) can perform a reduction process faster than the high-speed pixel-averaging technique of the illustrative aspects when the value of the lowest common multiple is set relatively low. However, since the lowest common multiple is relatively high in most cases, processing using this technique is often not possible or considerably slow.

Therefore, the results shown in FIG. 11 indicate that the high-speed pixel-averaging technique of the illustrative aspects can overcome the slow processing speeds at problematic points for the pixel-averaging technique (lowest common multiple) and obtain high-quality reduced images at a high speed.

Further, when using the pixel-averaging technique (floating point) described later with reference to FIG. 13, the processing times required for obtaining output images Q at two million, three million, four million, five million, six million, and seven million pixels are 1422, 1765, 2031, 2390, 2641, and 2922 ms, respectively.

As is clear from FIG. 11, the processing times (processing rates) when using this pixel-averaging technique (floating point) and the high-speed pixel-averaging technique of the illustrative aspects are slower than those when using the nearest neighbor technique or bilinear technique. However, when considering that the output images Q produced with pixel-averaging techniques are of a high quality that cannot be achieved with the nearest neighbor and bilinear techniques, the processing times of the high-speed pixel-averaging technique according to the illustrative aspects and the pixel-averaging technique (floating point) are in no way inferior to the processing times of the nearest neighbor and bilinear techniques.

As shown in FIG. 11, the processing times for the pixel-averaging technique (floating point) are greater than the processing times for the high-speed pixel-averaging technique of the illustrative aspects for all sizes of output image Q. Hence, the high-speed pixel-averaging technique of the illustrative aspects improves processing speeds over the pixel-averaging technique (floating point).

The degree of improvement in processing speed with the technique of the illustrative aspects increases as the image size of the output image Q increases. For example, the processing speed improves about 2-3% when producing an output image Q of two million and three million pixels, about 5% when producing an output image Q of four million pixels, and about 10% when producing an output image Q of five million, six million, and seven million pixels.

Hence, the results shown in FIG. 11 indicate that the high-speed pixel-averaging technique of the illustrative aspects can perform image reduction at dramatically faster processing speeds than image reduction using the pixel-averaging technique (floating point).

The processing time was also measured for the high-speed pixel-averaging technique of the illustrative aspects when increasing the division number nDev from 128 to 256. Here, measurements were only performed for the processing time required to obtain an output image Q of two million and four million pixels. These processing speeds were about 1-2% less than those obtained when using a division number nDev of 128.

Since a higher quality output image Q is obtained with a larger division number nDev, these results indicate that a higher quality output image Q can be obtained at a higher processing speed by increasing the division number nDev from 128 to 256.

As described above, processing times were measured using a Pentium 4 of 3.4 GHz processor as the CPU and two gigabytes of RAM as memory. However, the processing time changes when using a CPU having a different cache size while using the same size of RAM.

As described above, the printer 1 of the illustrative aspects executes the image-reducing program 12*a* for dividing the source image P into division blocks by a value nDev and for calculating the average pixel value for one pixel in the output image Q (reduced image) using division blocks as units, thereby obtaining an average pixel value through integer arithmetic. This method eliminates floating point operations used for decimals generated by the reduction ratio thereby remarkably improving processing speed in the pixel-averaging technique over the other technique and obtaining a high-quality reduced image at a fast speed.

Further, the image-reducing program 12*a* executed by the printer 1 of the illustrative aspects calculates the average pixel value according to integer arithmetic, as described above. Hence, the image-reducing program 12*a* is suitable for installation in apparatuses other than personal computers (such as printers) because CPUs provided in such apparatuses do not have good performance in floating point processing.

Further, by executing the image-reducing program 12*a*, the printer 1 of the illustrative aspects can obtain the output image Q without increasing the size of the source image P to a lowest common multiple of the output image size. Hence, the technique of the illustrative aspects dramatically improves processing speed over the above-mentioned other techniques, thereby obtaining a high-quality reduced image at a fast speed.

Further, the image-reducing program 12*a* executed by the printer 1 of the illustrative aspects sets the value of the division number nDev to a value within the range that the CPU 11 can process, thereby reliably preventing overflow in the CPU 11 during the reduction process.

Further, since the image-reducing program 12*a* executed by the printer 1 of the illustrative aspects sets the division number nDev to the maximum value within the range that can be processed by the CPU 11, the size of the division blocks produced by dividing the source image P with the division number nDev is the finest size within the range that can be processed by the CPU 11. This maximizes the resolution based on the size of individual division blocks, reliably reducing error that occurs when using division block units. As a result, it is possible to obtain a high-quality reduced image in a range that can be processed by the CPU 11.

While the invention has been described in detail with reference to the above aspects thereof, it would be apparent to those skilled in the art that various changes and modifications may be made therein without departing from the spirit of the invention.

In the illustrative aspects described above, the image-reducing program 12*a* is installed on the printer 1 and executed to obtain the output image Q by reducing the source image P inputted into the printer 1. However, it is also possible to install the image-reducing program 12*a* on the personal computer 2. In this case, the CPU of the personal computer 2 executes the image-reducing program 12*a* to obtain the output image Q as a reduced image of the source image P.

Further, the printer 1 of the illustrative aspects executes a reduction process in software using the image-reducing program 12a. However, each process performed by the image-reducing program 12a can be configured in hardware on the printer 1 or on the personal computer 2.

Further, the printer 1 of the illustrative aspects is configured to acquire a reduction ratio from the size of the source image P and a user-inputted output image size. However, it is also possible to have the user input the reduction ratio rather than the output image size.

Further, the printer 1 of the illustrative aspects is configured to obtain a reduction ratio from a user-inputted output image size. However, the printer 1 may also automatically set the reduction ratio. For example, the printer 1 may be configured to set a suitable reduction ratio based on the size of the recording medium loaded in the printer 1.

Further, the printer 1 of the illustrative aspects is configured to find the endpoint of division blocks in the main scanning direction and subscanning direction for one pixel of the output image Q by truncating values to the right of the decimal according to a gaussian symbol. However, it is also possible to round up the value.

COMPARATIVE EXAMPLE

FIG. 12 is an explanatory diagram illustrating the technique according to a comparative example, for obtaining average values of pixels in source image parts corresponding to the reduced image. For the sake of description, the technique in FIG. 12 reduces the source image only in the main scanning direction (x direction) and not the subscanning direction (y direction).

FIG. 12 shows a source image P' configured of the five pixels P'0-P'4 arranged in the main scanning direction, and a reduced image Q' configured of the three pixels Q'0-Q'2 acquired by reducing the source image P'. In the example of FIG. 12, the number of pixels in the source image P' corresponding to one pixel in the reduced image Q' is not an integer. For example, the pixel Q'0 in the reduced image Q' of FIG. 12 corresponds to the pixel P'0 and part of the pixel P'1 in the source image P'.

Figure 13:
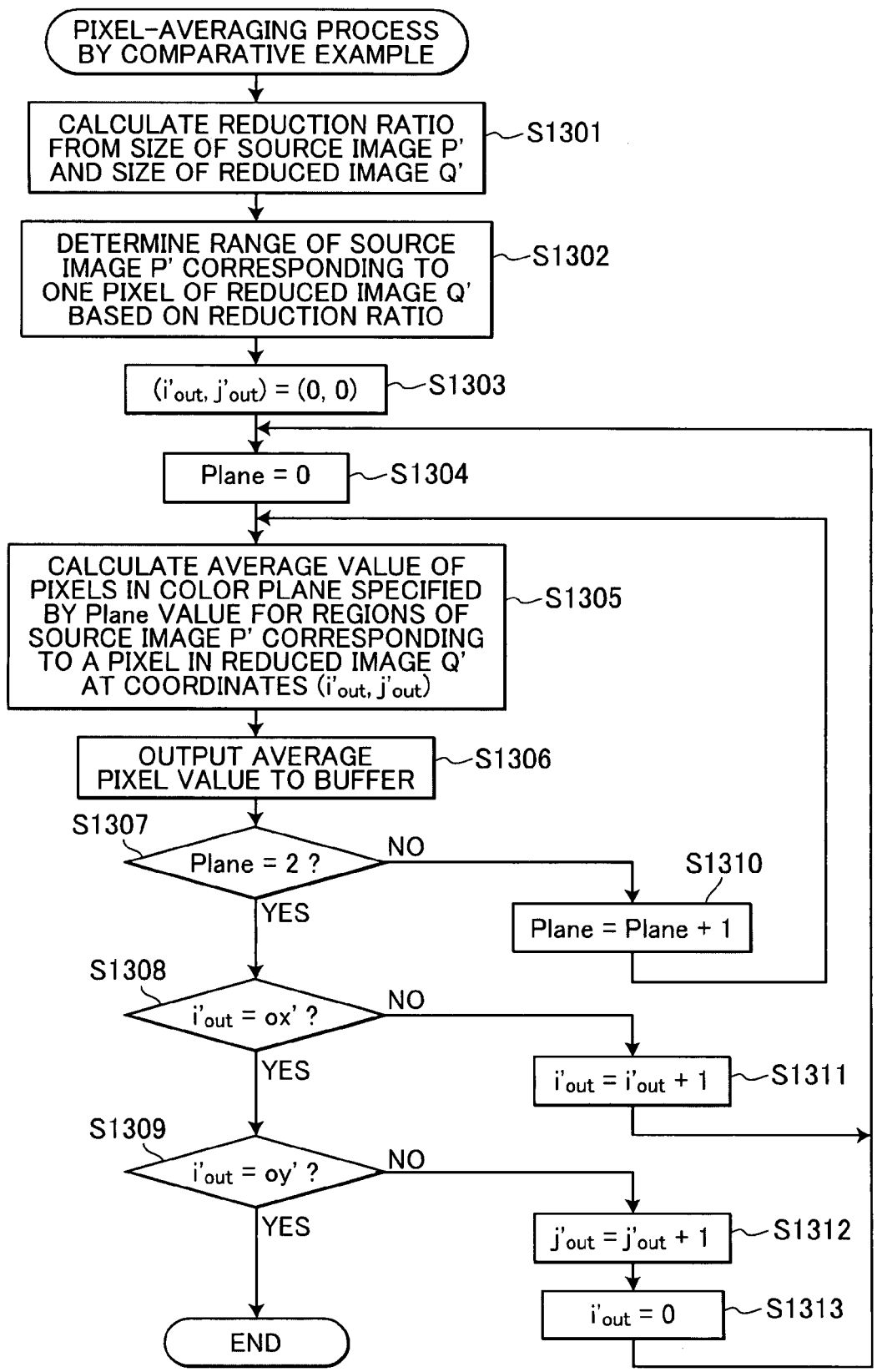
FIG. 13 is a flowchart illustrating steps in a pixel-averaging process according to the comparative example.

When applying a technique for acquiring an average value of pixels in part of the source image corresponding to the reduced image, the process shown in FIG. 13 using the pixel-averaging algorithm is employed. FIG. 13 is a flowchart illustrating steps in the pixel-averaging process according to the comparative example, executed by a CPU to acquire an average value of pixels in the part of the source image corresponding to the reduced image.

In S1301 of the process shown in FIG. 13, the CPU calculates a reduction ratio from an image size (ix'×iy') of the source image P', and an image size (ox'×oy') of the reduced image Q' specified by the user. In S1302 the CPU determines a range of the source image P' corresponding to one pixel in the reduced image Q' based on the calculated reduction ratio.

Next, the CPU sets a coordinate $i'_{out}$ in the main scanning direction (x direction) and a coordinate $j'_{out}$ in the subscanning direction (y direction) to the top coordinates (0,0) of a pixel in the reduced image Q' in S1303 and sets a variable Plane to 0 in S1304. The variable Plane specifies the color plane. When the image data is configured of RGB values, the variable Plane can be assigned one of three values from 0 to 2. The value assigned the variable Plane specifies one of a red (R) plane (Plane=0), green (G) plane (Plane=1), and blue (B) plane (Plane=2). FIG. 13 describes an example in which the image data is configured of RGB values.

After completing the process in S1304, in S1305 the CPU calculates an average value of pixels in the color plane specified by the variable Plane within a region of the source image P' corresponding to the pixel at coordinates ($i'_{out}$, $j'_{out}$) in the reduced image Q'. In S1306 the CPU outputs the average pixel value calculated in S1305 to a buffer.

In S1307 the CPU determines whether the variable Plane is 2. If the variable Plane is 0 or 1 (S1307: NO), then in S1310 the CPU increments the variable Plane and returns to S1305. Hence, the CPU executes the process in S1305 and S1306 for the color plane corresponding to the next plane value.

However, if the CPU determines that the variable Plane is 2 in S1307 (S1307: YES), indicating that pixel values for the pixel in the reduced image Q' at the coordinates ($i'_{out}$, $j'_{out}$) have been acquired for all color planes (R, G, and B), then in S1308 the CPU determines whether $i_{out}$=ox'. In other words, the CPU determines whether the pixel at the coordinates ($i'_{out}$, $j'_{out}$) in the reduced image Q' is the final pixel in the main scanning direction.

If the CPU determines that $i'_{out}$ does not equal ox' (S1308: NO), then the CPU increments the value of $i'_{out}$ in S1311, thereby advancing the pixel specified in the reduced image Q' in the main scanning direction, and subsequently returns to S1304. Accordingly, the processes in S1304-S1307 and S1310 are repeated for the pixel in the output image Q', which was advanced in the main scanning direction in S1311.

However, if the CPU determines in S1308 that $i'_{out}$=ox' (S1308: YES), indicating that average pixel values have been calculated for all pixels having the same coordinate $j'_{out}$ in the subscanning direction. Accordingly, in S1309 the CPU determines whether $j'_{out}$=oy'. In other words, the CPU determines whether the pixel in the reduced image Q' at the coordinates ($i'_{out}$, $j'_{out}$) is the final pixel in the subscanning direction.

If the CPU determines that $j'_{out}$ does not equal oy' (S1309: NO), then in S1312 the CPU increments the value of $j'_{out}$ and in S1313 sets the value of $i'_{out}$ to 0. Consequently, the position of pixels selected from among pixels constituting the reduced image Q' is advanced one place in the subscanning direction and returned to the beginning coordinate in the main scanning direction. Accordingly, the processes in S1304-S1307 and S1310 are executed on a pixel in the output image Q', which was advanced one place in the subscanning direction in S1312 and S1313.

However, if the CPU determines in S1309 that $j'_{out}$=oy' (S1309: YES), indicating that average pixel values have been calculated for all (ox'×oy') pixels in the reduced image Q', then the pixel-averaging process by the comparative example ends. In this way, the pixel-averaging process employs a pixel-averaging algorithm to reduce the source image P' of the size (ix'×iy') to the reduced image Q' of the size (ox'×oy').

According to the pixel-averaging process according to the comparative example, the processing speed is slower than that of the illustrative aspects described above. One factor contributing to this slower processing speed is likely the floating point operation performed in S1305. As illustrated in the example of FIG. 12, the part of the pixel P'1 corresponding to the image Q'0 corresponds to (1−t), where the entire pixel is divided by the ratio (1−t):t. Accordingly, the CPU calculates the value of the pixel Q'0 in S1305 of FIG. 13 by performing the computation $\{1 \times P'0+(1-t) \times P'1\}/\{1+(1-t)\}$. Since (1−t) is a decimal, a floating point operation is performed. This operation likely limits any improvement in processing speed. According to the technique in the illustrative aspects described above, such problem does not occur since the technique does not involve floating point operations.

What is claimed is:

1. An image processing device comprising:
   an inputting section that inputs a substantially rectangular source image configured of a plurality of pixels arranged in a first direction and in a second direction substantially perpendicular to the first direction, the plurality of pixels having respective pixel values; and a reducing section that reduces the source image for obtaining a substantially rectangular output image configured of a plurality of pixels arranged in the first direction and in the second direction, the reducing section comprising:

a reduction-ratio acquiring section that acquires a reduction ratio for reducing the source image into the output image;

a division-number determining section that determines a division number nDev for dividing each pixel constituting the source image into (nDev×nDev) division blocks, where nDev is an integer that is greater than or equal to two, and (nDev×nDev) is a square of the division number nDev;

a process-block-number calculating section that calculates, based on the reduction ratio, a number of division blocks corresponding to a single pixel in the output image;

an average-pixel-value calculating section that calculates, for the single pixel, an average pixel value based on pixel values of the division blocks, the pixel values of the division blocks being pixels values of corresponding pixels in the source image; and a repeating section that allows the process-block-number calculating section and the average-pixel-value calculating section to repeat same processes for each of the plurality of pixels in the output image, thereby obtaining an entire output image.

2. The image processing device according to claim 1, wherein the division number nDev is a maximum value that can be processed by processing capacity of the image processing device.

3. The image processing device according to claim 1, wherein the division-number determining section determines the division number nDev based on at least both of the reduction ratio and a value indicating processing capacity of the image processing device.

4. The image processing device according to claim 3, wherein the division-number determining section determines the division number nDev further based on a number of color data that is assigned to each pixel.

5. The image processing device according to claim 1, wherein, when the number of division blocks is a decimal number including an integer part and a fractional part which is to the right of a decimal point, the process-block-number calculating section rounds the number of division blocks down to an integer value by truncating the fractional part.

6. The image processing device according to claim 5, wherein the division-number determining section determines the division number nDev so as to reduce errors between pixels in the source image and corresponding pixels in the output image.

7. The image processing device according to claim 1, wherein the plurality of pixels in the source image includes ix pixels in the first direction and iy pixels in the second direction, and the plurality of pixels in the output image includes ox pixels in the first direction and oy pixels in the second direction; and wherein the division-number determining section determines the division number nDev according to an equation $$nDev = \left[ \frac{-(Dx + Dy) + \sqrt{(Dx + Dy)^2 - 4DxDy\left(1 - \frac{ValueMax}{PaletteMax}\right)}}{2DxDy} \right]$$

where a symbol [ ] is a gaussian symbol that represents a maximum integer that does not exceed a value contained with brackets, Dx is (ix−rx)/ox, rx is a remainder of ix/ox, Dy is (iy−ry)/oy, ry is a remainder of iy/oy, ValueMax is a value indicating processing capacity of the image processing device, and PaletteMax is a maximum value of color data that is assigned to each pixel.

8. The image processing device according to claim 1, further comprising:

a source-image-size acquiring section that acquires a number of the plurality of pixels in the source image inputted from the inputting section; and an output-image-size inputting section that inputs a number of the plurality of pixels in the output image, wherein the reduction-ratio acquiring section acquires the reduction ratio from both the number of the plurality of pixels in the source image and the number of the plurality of pixels in the output image.

9. The image processing device according to claim 1, further comprising a reduction-ratio inputting section that inputs the reduction ratio, wherein the reduction-ratio acquiring section acquires the reduction ratio inputted by the reduction-ratio inputting section.

10. The image processing device according to claim 1, wherein the process-block-number calculating section calculates the number of division blocks with a division block adjacent to division blocks that have already been used by the average-pixel-value calculating section as a start point.

11. The image processing device according to claim 1, wherein the process-block-number calculating section comprises a first dividing section that divides the single pixel into a plurality of regions in the first direction, the plurality of regions in the first direction including:

a front residual region that includes N1 division blocks corresponding to an unprocessed portion of a pixel in the source image at process of a previous single pixel, where N1 is an integer that is greater than or equal to zero and that is less than the division number nDev;

a middle region that is adjacent to the front residual region and that includes N2 of consecutive complete pixels in the source image, where N2 is an integer greater than or equal to one; and a rear residual region that is adjacent to the middle region and that includes N3 division blocks corresponding to a remaining part less than one pixel in the source image, where N3 is an integer that is greater than or equal to zero and that is less than the division number nDev; and wherein the average-pixel-value calculating section calculates a sum of the pixel values in each of the plurality of regions divided by the first dividing section, and divides the sum of the pixel values by the number of division blocks corresponding to the single pixel in the output image.

12. The image processing device according to claim 1, wherein the process-block-number calculating section comprises:

a first dividing section that divides the single pixel into a plurality of regions in the first direction, the plurality of regions in the first direction including:
  a first front residual region that includes N1 division blocks corresponding to an unprocessed portion of a pixel in the source image at process of a previous single pixel, where N1 is an integer that is greater than or equal to zero and that is less than the division number nDev;
  a first middle region that is adjacent to the first front residual region and that includes N2 of consecutive complete pixels in the source image, where N2 is an integer greater than or equal to one; and
  a first rear residual region that is adjacent to the first middle region and that includes N3 division blocks corresponding to a remaining part less than one pixel in the source image, where N3 is an integer that is greater than or equal to zero and that is less than the division number nDev; and
a second dividing section that divides the single pixel into a plurality of regions in the second direction, the plurality of regions in the second direction including:
  a second front residual region that includes N4 division blocks corresponding to an unprocessed portion of a pixel in the source image at process of a previous single pixel, where N4 is an integer that is greater than or equal to zero and that is less than the division number nDev;
  a second middle region that is adjacent to the second front residual region and that includes N5 of consecutive complete pixels in the source image, where N5 is an integer greater than or equal to one; and
  a second rear residual region that is adjacent to the second middle region and that includes N6 division blocks corresponding to a remaining part less than one pixel in the source image, where N6 is an integer that is greater than or equal to zero and that is less than the division number nDev; and
wherein the average-pixel-value calculating section calculates a sum of the pixel values in each of the plurality of regions produced through division by the first dividing section and the second dividing section, and divides the sum of the pixel values by the number of division blocks corresponding to the single pixel in the output image.

13. A storage medium storing a set of program instructions executable on an image processing device, the set of program instructions comprising:
  acquiring a reduction ratio for reducing a substantially rectangular source image to obtain a substantially rectangular output image, the source image being configured of a plurality of pixels arranged in a first direction and in a second direction substantially perpendicular to the first direction, the plurality of pixels having respective pixel values, the output image being configured of a plurality of pixels arranged in the first direction and in the second direction;
  determining a division number nDev for dividing each pixel constituting the source image into (nDev×nDev) division blocks, where nDev is an integer that is greater than or equal to two, and (nDev×nDev) is a square of the division number nDev;
  calculating, based on the reduction ratio, a number of division blocks corresponding to a single pixel in the output image;
  calculating, for the single pixel, an average pixel value based on pixel values of the division blocks, the pixel values of the division blocks being pixels values of corresponding pixels in the source image; and
  repeating same processes of calculating the number of division blocks and calculating the average pixel value for each of the plurality of pixels in the output image, thereby obtaining an entire output image.

14. The storage medium according to claim 13, wherein the division number nDev is a maximum value that can be processed by processing capacity of the image processing device.

15. The storage medium according to claim 13, wherein the instructions for determining the division number nDev comprise determining the division number nDev based on at least both of the reduction ratio and a value indicating processing capacity of the image processing device.

16. The storage medium according to claim 15, wherein the instructions for determining the division number nDev comprise determining the division number nDev further based on a number of color data that is assigned to each pixel.

17. The storage medium according to claim 13, wherein the instructions for calculating the number of division blocks comprise rounding, when the number of division blocks is a decimal number including an integer part and a fractional part which is to the right of a decimal point, the number of division blocks down to an integer value by truncating the fractional part.

18. The storage medium according to claim 17, wherein the instructions for determining the division number nDev comprise determining the division number nDev so as to reduce errors between pixels in the source image and corresponding pixels in the output image.

19. The storage medium according to claim 13, wherein the plurality of pixels in the source image includes ix pixels in the first direction and iy pixels in the second direction, and the plurality of pixels in the output image includes ox pixels in the first direction and oy pixels in the second direction; and
  wherein the instructions for determining the division number nDev comprise determining the division number nDev according to an equation $$nDev = \left[ \frac{-(Dx+Dy) + \sqrt{(Dx+Dy)^2 - 4DxDy\left(1 - \frac{ValueMax}{PaletteMax}\right)}}{2DxDy} \right]$$

where a symbol [ ] is a gaussian symbol that represents a maximum integer that does not exceed a value contained with brackets, Dx is (ix−rx)/ox, rx is a remainder of ix/ox, Dy is (iy−ry)/oy, ry is a remainder of iy/oy, ValueMax is a value indicating processing capacity of the image processing device, and PaletteMax is a maximum value of color data that is assigned to each pixel.

20. The storage medium according to claim 13, wherein the set of program instructions further comprises:
  acquiring a number of the plurality of pixels in the source image; and
  inputting a number of the plurality of pixels in the output image; and
  wherein the instructions for acquiring the reduction ratio comprise acquiring the reduction ratio from both the number of the plurality of pixels in the source image and the number of the plurality of pixels in the output image.

21. The storage medium according to claim 13, wherein the set of program instructions further comprises inputting the reduction ratio; and wherein the instructions for acquiring the reduction ratio comprise acquiring the reduction ratio inputted by the instructions for inputting the reduction ratio.

22. The storage medium according to claim 13, wherein the instructions for calculating the number of division blocks comprise calculating the number of division blocks with a division block, as a start point, adjacent to division blocks that have already been used by the instructions for calculating the average pixel value.

23. The storage medium according to claim 13, wherein the instructions for calculating the number of division blocks comprise dividing the single pixel into a plurality of regions in the first direction, the plurality of regions in the first direction including:

a front residual region that includes N1 division blocks corresponding to an unprocessed portion of a pixel in the source image at process of a previous single pixel, where N1 is an integer that is greater than or equal to zero and that is less than the division number nDev;

a middle region that is adjacent to the front residual region and that includes N2 of consecutive complete pixels in the source image, where N2 is an integer greater than or equal to one; and a rear residual region that is adjacent to the middle region and that includes N3 division blocks corresponding to a remaining part less than one pixel in the source image, where N3 is an integer that is greater than or equal to zero and that is less than the division number nDev; and wherein the instructions for calculating the average pixel value comprise:

calculating a sum of the pixel values in each of the plurality of regions divided by the instructions for dividing the single pixel in the first direction; and dividing the sum of the pixel values by the number of division blocks corresponding to the single pixel in the output image.

24. The storage medium according to claim 23, wherein the instructions for calculating the number of division blocks further comprise determining a position in the first direction of a pixel in the source image, the pixel in the source image including the front residual region.

25. The storage medium according to claim 13, wherein the instructions for calculating the number of division blocks comprise:

dividing the single pixel into a plurality of regions in the second direction, the plurality of regions in the first direction including:

a first front residual region that includes N1 division blocks corresponding to an unprocessed portion of a pixel in the source image at process of a previous single pixel, where N1 is an integer that is greater than or equal to zero and that is less than the division number nDev;

a first middle region that is adjacent to the first front residual region and that includes N2 of consecutive complete pixels in the source image, where N2 is an integer greater than or equal to one; and a first rear residual region that is adjacent to the first middle region and that includes N3 division blocks corresponding to a remaining part less than one pixel in the source image, where N3 is an integer that is greater than or equal to zero and that is less than the division number nDev; and dividing the single pixel into a plurality of regions in the second direction, the plurality of regions in the second direction including:

a second front residual region that includes N4 division blocks corresponding to an unprocessed portion of a pixel in the source image at process of a previous single pixel, where N4 is an integer that is greater than or equal to zero and that is less than the division number nDev;

a second middle region that is adjacent to the second front residual region and that includes N5 of consecutive complete pixels in the source image, where N5 is an integer greater than or equal to one; and a second rear residual region that is adjacent to the second middle region and that includes N6 division blocks corresponding to a remaining part less than one pixel in the source image, where N6 is an integer that is greater than or equal to zero and that is less than the division number nDev; and wherein the instructions for calculating the average pixel value comprise:

calculating a sum of the pixel values in each of the plurality of regions produced through division by the instructions for dividing the single pixel in the first direction and the instructions for dividing the single pixel in the second direction; and dividing the sum of the pixel values by the number of division blocks corresponding to the single pixel in the output image.

26. The storage medium according to claim 25, wherein the instructions for calculating the number of division blocks further comprise:

determining a position in the first direction of a first pixel in the source image, the first pixel in the source image including the first front residual region; and determining a position in the second direction of a second pixel in the source image, the second pixel in the source image including the second front residual region.

* * * * *